United States Patent
Akenine-Moller et al.

(10) Patent No.: US 10,600,232 B2
(45) Date of Patent: Mar. 24, 2020

(54) CREATING A RAY DIFFERENTIAL BY ACCESSING A G-BUFFER

(71) Applicant: NVIDIA Corporation, Santa Clara, CA (US)

(72) Inventors: Tomas Akenine-Moller, Lund (SE); Robert Toth, Lund (SE); Magnus Andersson, Lund (SE); Jim Kjell David Nilsson, Lund (SE)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/022,506

(22) Filed: Jun. 28, 2018

(65) Prior Publication Data

US 2019/0236831 A1    Aug. 1, 2019

Related U.S. Application Data

(63) Continuation-in-part of application No. 15/881,619, filed on Jan. 26, 2018, now abandoned.

(51) Int. Cl.
| | | |
|---|---|---|
| *G06T 15/06* | (2011.01) | |
| *G06T 15/80* | (2011.01) | |
| *G06T 15/10* | (2011.01) | |
| *G06T 11/00* | (2006.01) | |
| *G06T 15/00* | (2011.01) | |

(52) U.S. Cl.
CPC ............ *G06T 15/06* (2013.01); *G06T 11/001* (2013.01); *G06T 15/005* (2013.01); *G06T 15/10* (2013.01); *G06T 15/80* (2013.01); *G06T 2210/36* (2013.01)

(58) Field of Classification Search
CPC ..... G06T 15/04; G06T 11/001; G06T 15/005; G06T 1/60; G06T 15/503
See application file for complete search history.

(56) References Cited

U.S. PATENT DOCUMENTS

| | | |
|---|---|---|
| 10,460,504 B2 | 10/2019 | Akenine-Moller et al. |
| 2005/0179686 A1 | 8/2005 | Christensen et al. |
| 2013/0027417 A1 | 1/2013 | Merrell et al. |
| 2015/0109300 A1* | 4/2015 | Panteleev ............ G06T 15/506 345/426 |
| 2016/0260245 A1* | 9/2016 | DeCell .................... G06T 15/06 |
| 2019/0236830 A1 | 8/2019 | Akenine-Moller et al. |

OTHER PUBLICATIONS

Cabeleira; Joao; Combining Rasterization and Ray Tracing Techniques to Approximate Global Illumination in Real-Time; 2010; Instituto Superior Técnico; p. 1-10.*
Notice of Allowance from U.S. Appl. No. 16/010,316, dated Jun. 26, 2019.

(Continued)

*Primary Examiner* — Todd Buttram
(74) *Attorney, Agent, or Firm* — Zilka-Kotab, PC

(57) ABSTRACT

A texture level of detail (LOD) approximation may be performed utilizing ray differentials and a G-buffer. For example, a scene to be rendered is identified, and a G-buffer of the scene is rendered. Additionally, ray tracing is started for the scene, and during the ray tracing, a ray differential is created by accessing the G-buffer. Further, the created ray differential is appended to a current ray, and the created ray differential is traced.

21 Claims, 18 Drawing Sheets

(56) References Cited

OTHER PUBLICATIONS

Akenine-Moller et al., U.S. Appl. No. 16/010,316, filed Jun. 15, 2018.
Belcour et al., "5D Covariance Tracing for Efficient Defocus and Motion Blur," ACM Transactions on Graphics, vol. 32, No. 3, Jun. 2013, pp. 31:1-31:18.
Heckbert, P. "Survey of Texture Mapping," IEEE Computer Graphics and Applications, Nov. 1986, pp. 1-14.
Parker et al., "OptiX: A General Purpose Ray Tracing Engine," ACM Transactions on Graphics, vol. 29, No. 4, Jul. 2010, pp. 66:1-66:13.
Pharr et al., "Physically Based Rendering: From Theory to Implementation," Second Edition, Morgan Kaufmann Publishers, 2010, 1172 pages.
Segal et al., "The OpenGL Graphics System: A Specification," Version 4.5, Jun. 29, 2017, 805 pages.
Voorhies et al., "Reflection Vector Shading Hardware," SIGGRAPH '94, Jul. 1994, 4 pages.
Williams, L., "Pyramidal Parametrics," Computer Graphics, vol. 17, No. 3, Jul. 1983, pp. 1-11.

\* cited by examiner

US 10,600,232 B2

CREATING A RAY DIFFERENTIAL BY ACCESSING A G-BUFFER

CLAIM OF PRIORITY

This application is a continuation-in-part of U.S. application Ser. No. 15/881,619, filed Jan. 26, 2018, the entire contents of which is incorporated herein by reference.

FIELD OF THE INVENTION

The present invention relates to image rendering, and more particularly to computing texture footprints in reflections during real-time ray tracing.

BACKGROUND

High quality texturing is desirable for real-time ray tracing in order to improve a look of rendered images. However, current methods for performing texturing utilize ray differentials or covariance matrices or nearest-neighbor sampling, which either uses a lot of memory per pixel, as well as a large amount of instructions, to compute a texture footprint, or results in low quality images. Without proper texture filtering, a texture visible in a reflection may alias which may result in flickering as objects or the camera move. Existing methods are either too expensive or result in low quality results. Therefore, a faster means of texturing is needed.

Thus, there is a need for addressing these issues and/or other issues associated with the prior art.

SUMMARY

A method, computer readable medium, and system are disclosed for performing a texture level-of-detail approximation. For example, a scene to be rendered is identified, and a G-buffer of the scene is rendered. Additionally, ray tracing is started for the scene, and during the ray tracing, a ray differential is created by accessing the G-buffer. Further, the created ray differential is appended to a current ray, and the created ray differential is traced.

DETAILED DESCRIPTION

Figure 1:
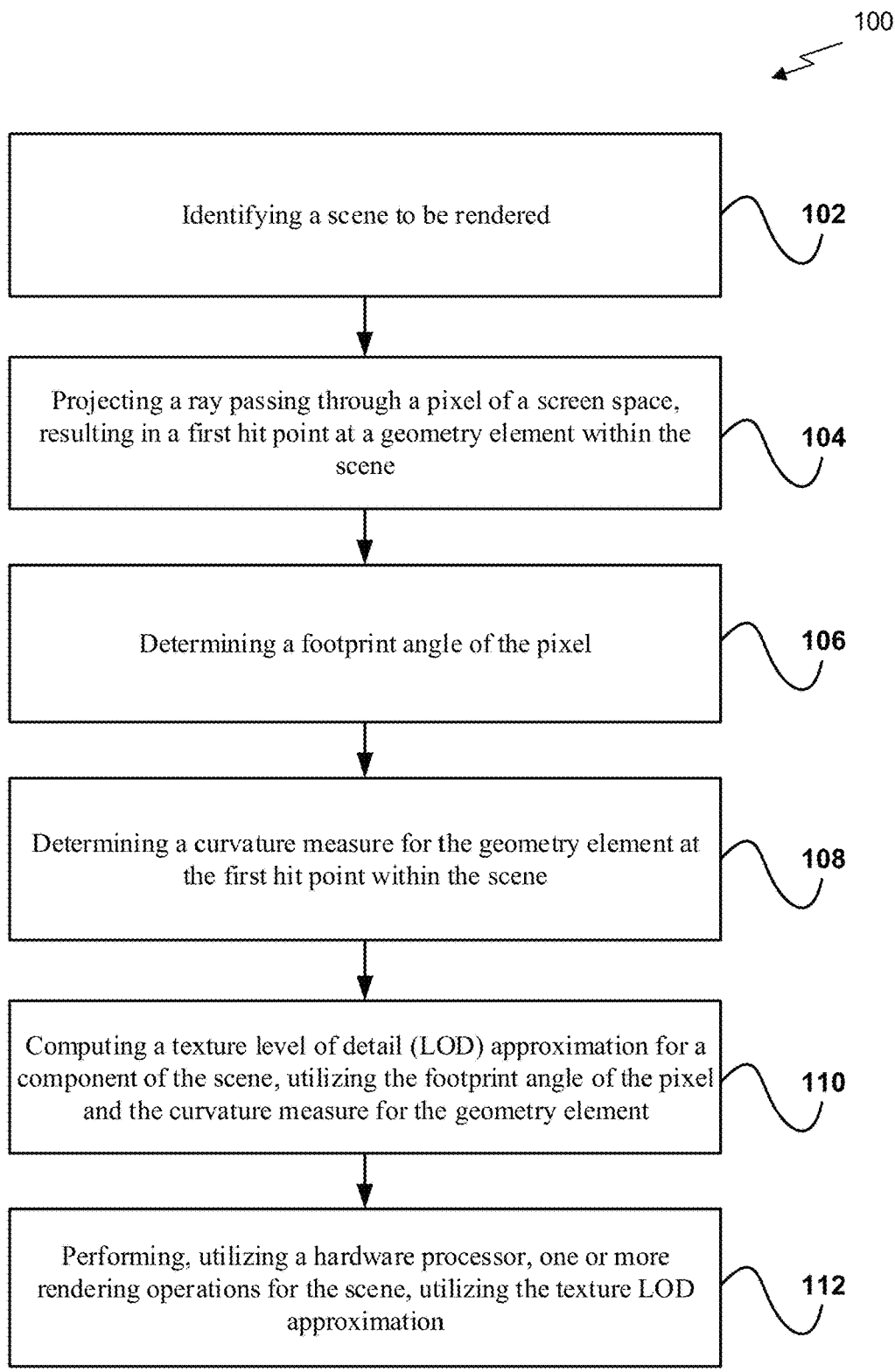
FIG. 1 illustrates a flowchart of a method for performing a texture level-of-detail approximation, in accordance with one embodiment.

FIG. 1 illustrates a flowchart of a method 100 for performing a texture level-of-detail (LOD) approximation, in accordance with one embodiment. In one embodiment, the LOD approximation may be used to estimate the size of a texture footprint (e.g., by computing a texture footprint for a second hit point such as a reflection point). As shown in operation 102, a scene to be rendered is identified. Additionally, as shown in operation 104, a ray is projected that passes through a pixel of a screen space, resulting in a first hit point at a geometry element within the scene.

Further, as shown in operation 106, a footprint angle of the pixel is determined. In one embodiment, the footprint angle may include a spread angle $\alpha$ that models a spread of the pixel in radians. Further still, as shown in operation 108, a curvature measure for the geometry element is determined at the first hit point within the scene. For example, the curvature measure $\beta$ may be used to determine an additional spread of the pixel induced by a curvature at the hit point.

In one embodiment, the curvature measure $\beta$ may be precomputed per vertex, and may be interpolated over a triangle. In another embodiment, determining the curvature measure may include negating the curvature measure when the geometry is concave. In yet another embodiment, the spread angle may be propagated through the scene as a ray bounces around within the scene.

Also, as shown in operation 110, a texture level of detail (LOD) approximation is computed for a component of the scene, utilizing the footprint angle of the pixel and the curvature measure for the geometry element. In one embodiment, a distance to the hit point, a ray direction, and a normal at the hit point may also be utilized to compute the LOD approximation for the component of the scene.

In another embodiment, the component may include a reflection within the scene, a recursive reflection within the scene, etc. In yet another embodiment, the component may include a refraction within the scene, a recursive refraction within the scene, etc. In still another embodiment, the LOD approximation may be used to estimate a size of a texture footprint for a second hit point.

In one embodiment, when the component includes a recursive reflection or a recursive refraction, a projected footprint may be determined at the first hit point. The projected footprint may be transported from the first hit point to a second hit point, and a size of the projected footprint may be used as the texture LOD approximation for the component at the second hit point.

In addition, as shown in operation 112, utilizing a hardware processor, one or more rendering operations are performed for the scene, utilizing the texture LOD approximation. In one embodiment, the one or more rendering operations may include one or more texturing operations. In another embodiment, the one or more rendering operations may include one or more mipmapping operations that are performed utilizing the texture LOD approximation. In yet another embodiment, the one or more rendering operations may include determining a plurality of mipmapped reflections or reflections or a combination of the two, utilizing the texture LOD approximation.

In this way, a texture LOD approximation may be computed based on an isotropic derivation. Additionally, a footprint angle and a curvature measure may be used in approximation operations. As a result, a number of instructions used to compute texture footprints in reflections, as well as an amount of memory bandwidth used to compute texture footprints in reflections, may be reduced.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
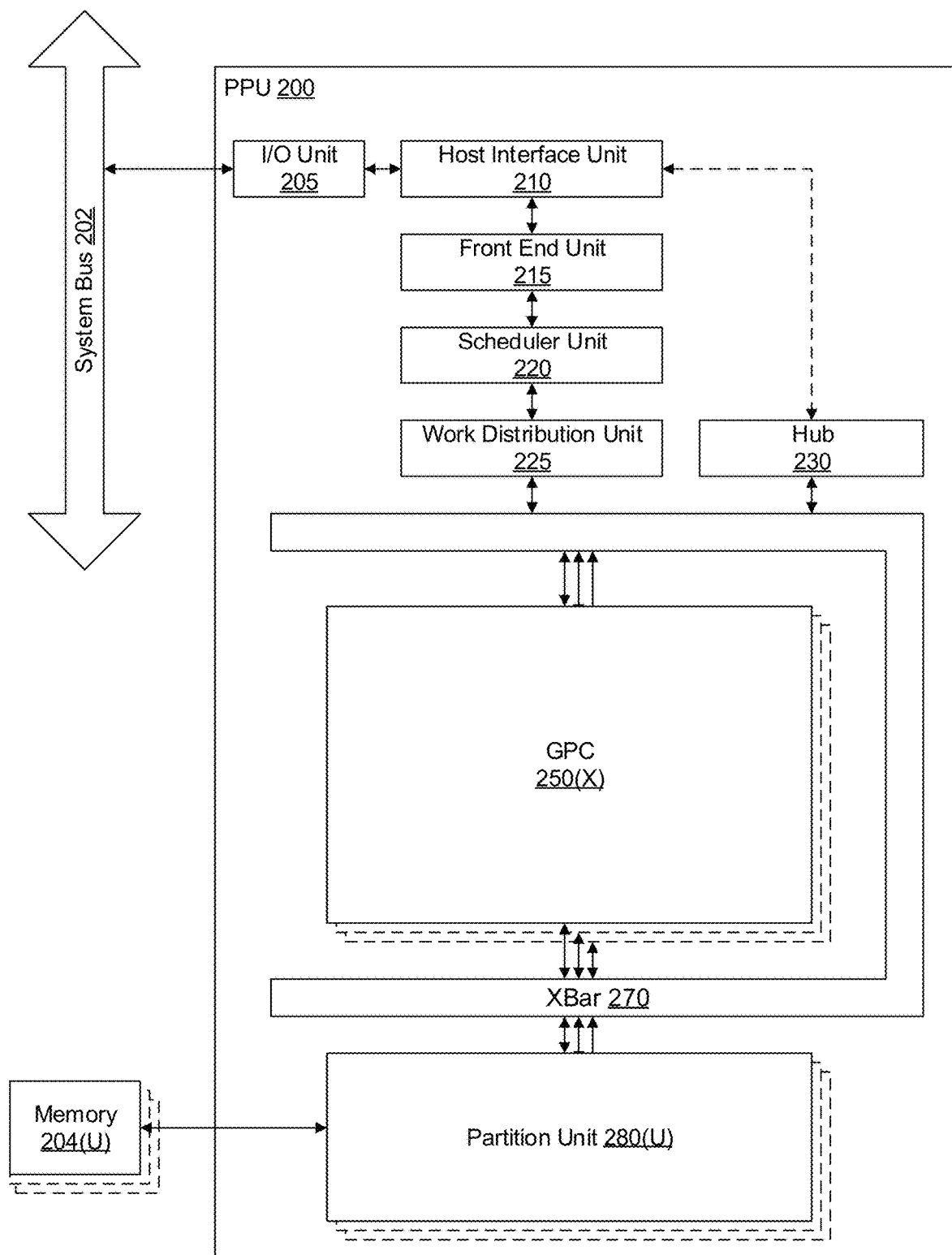
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202.

The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
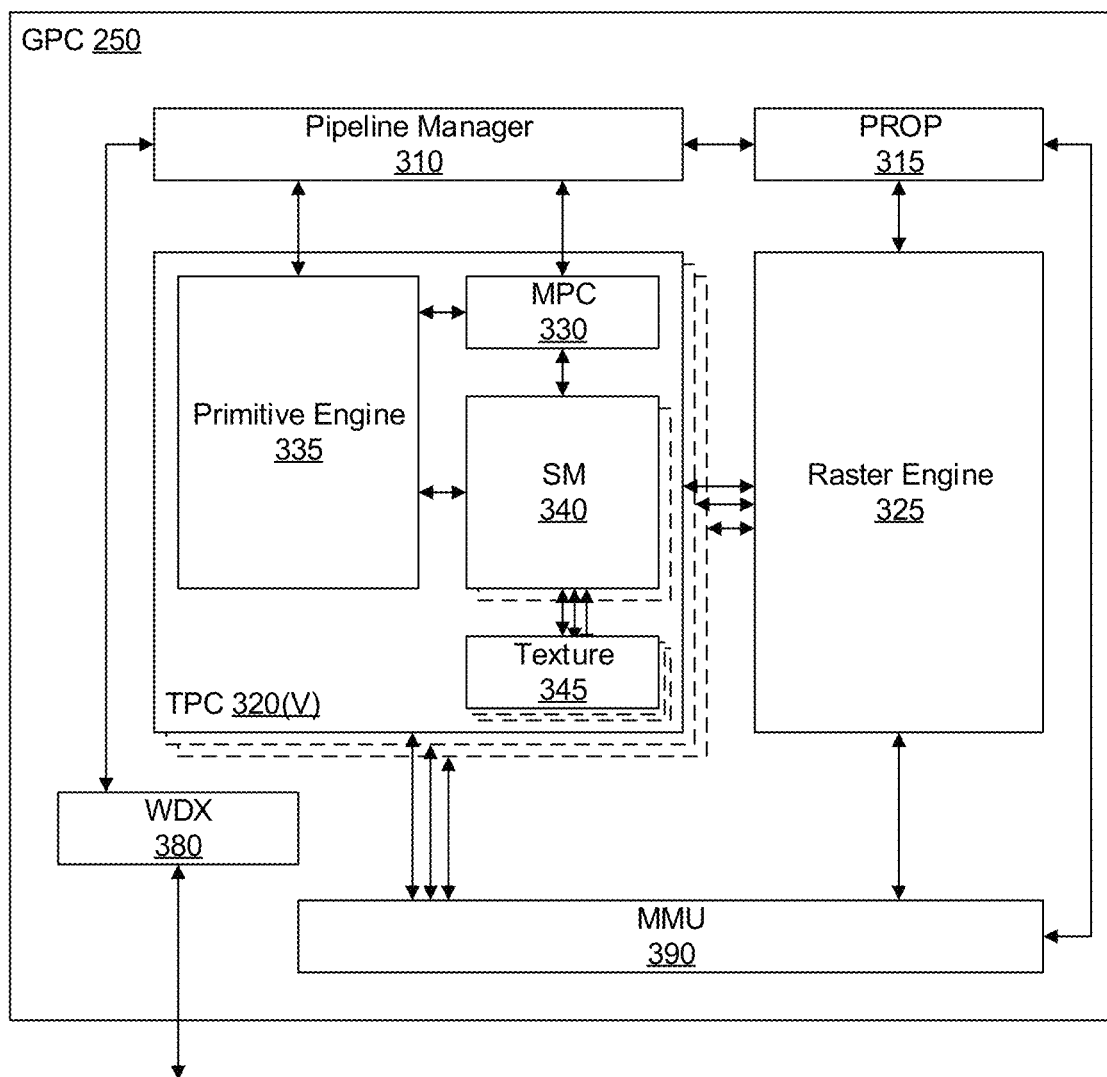
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
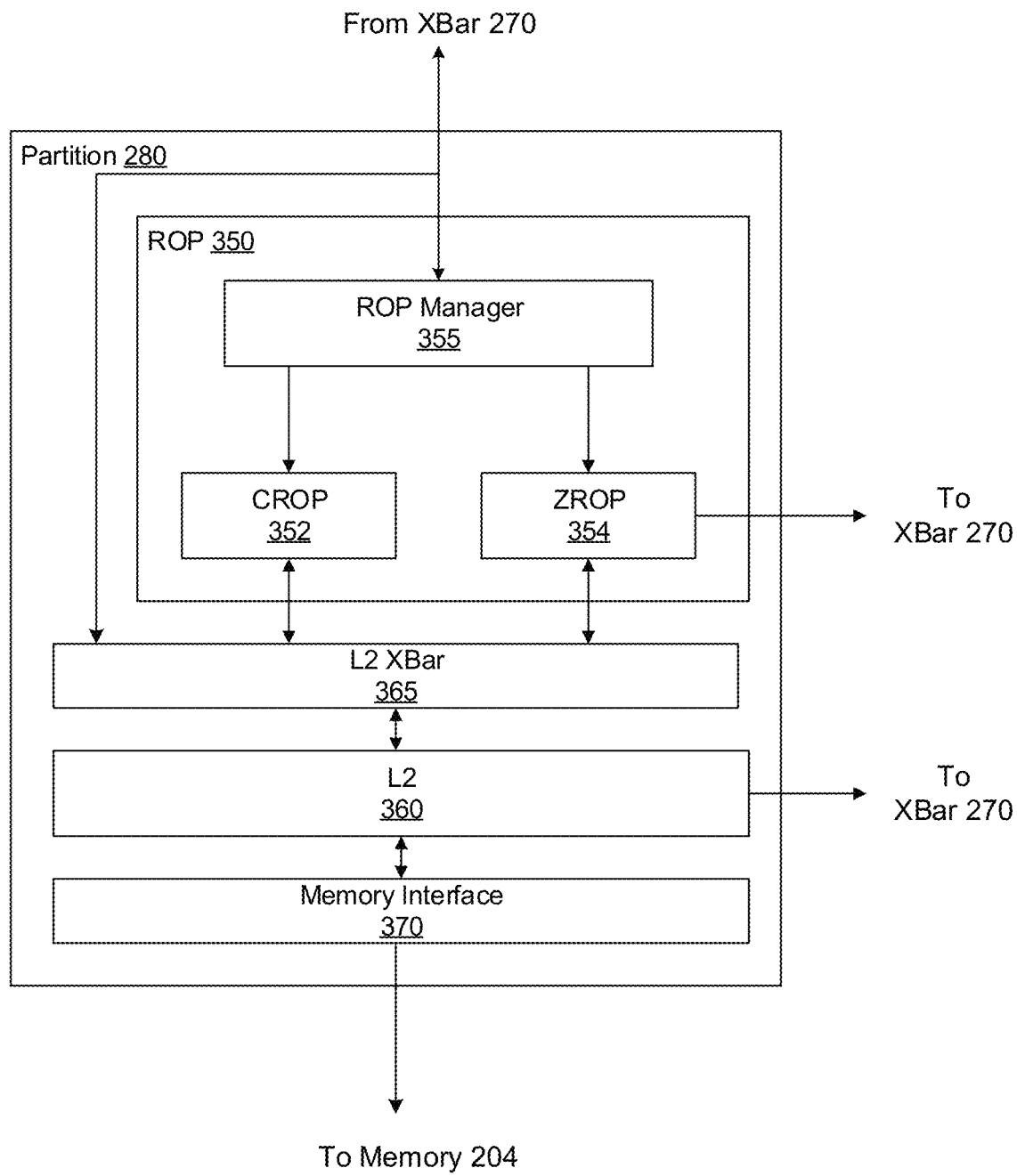
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
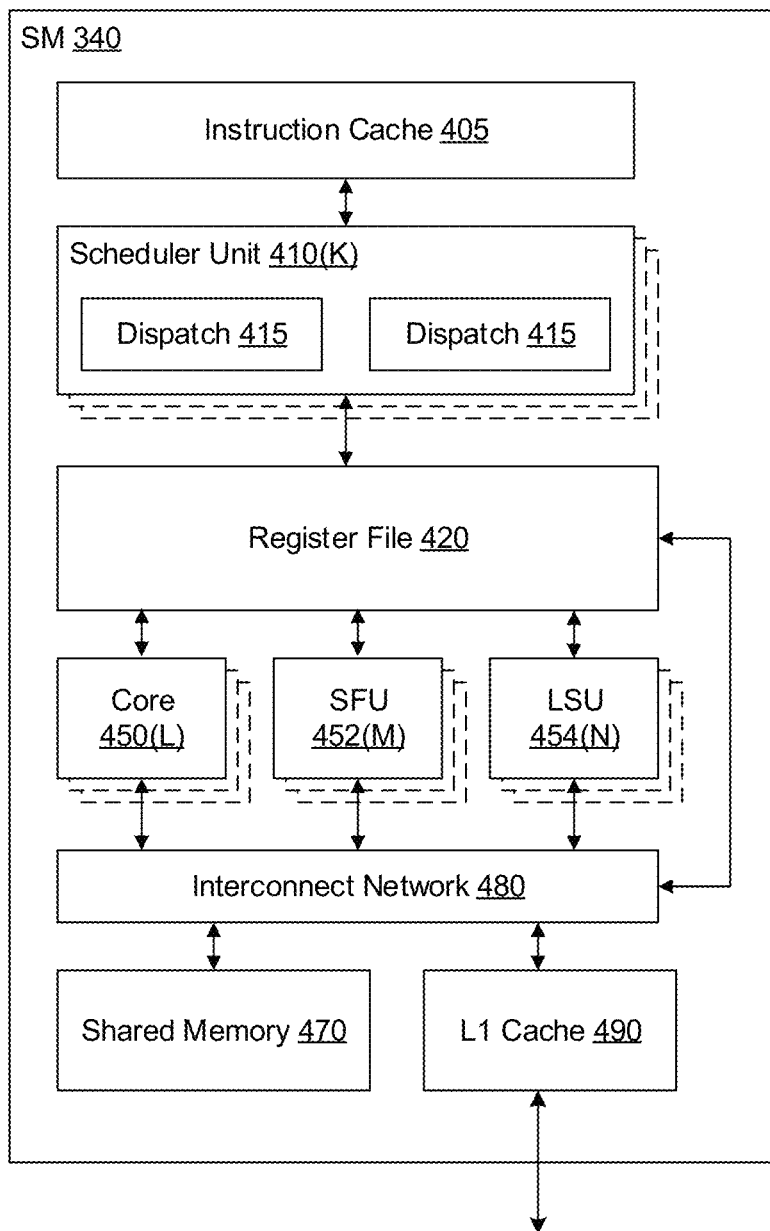
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
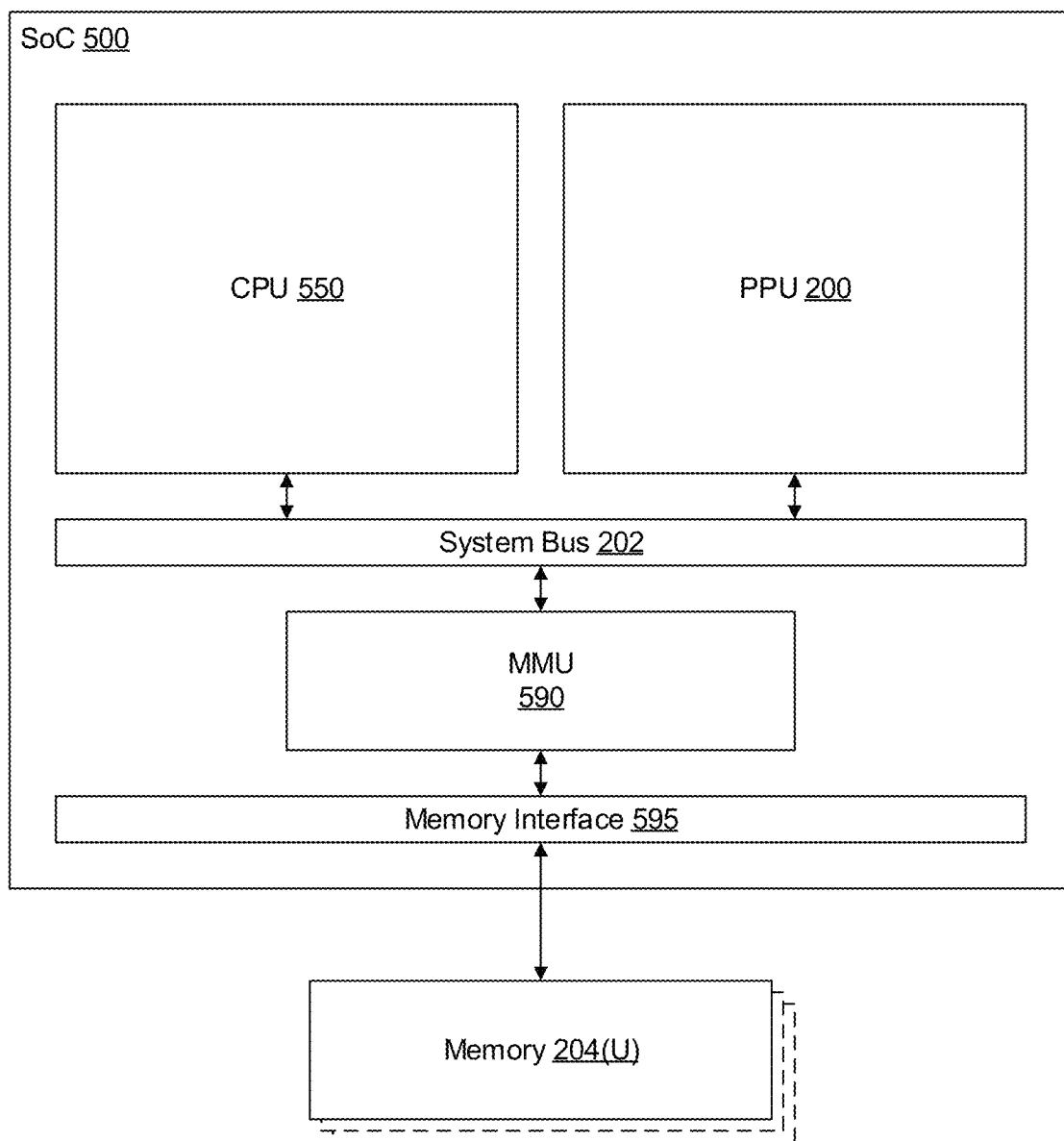
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
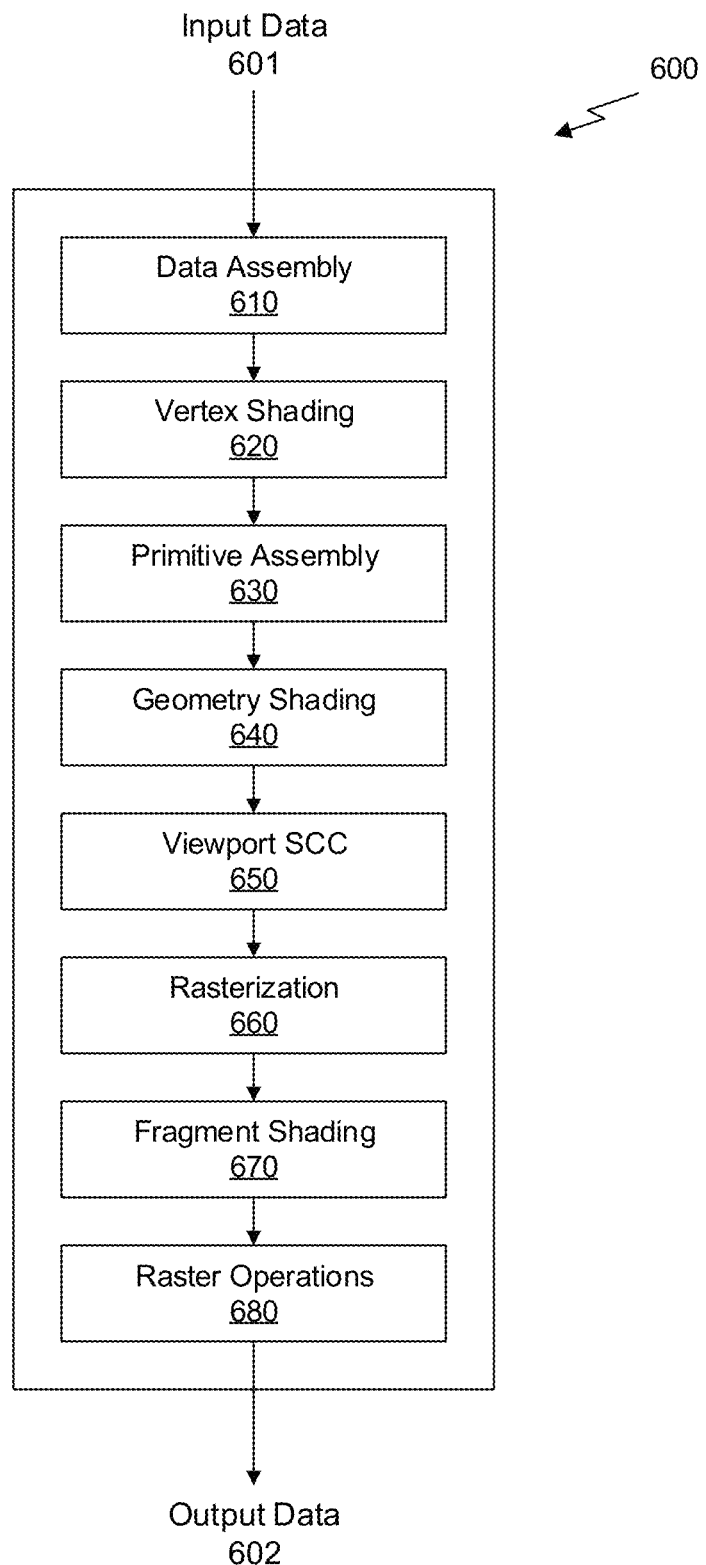
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7:
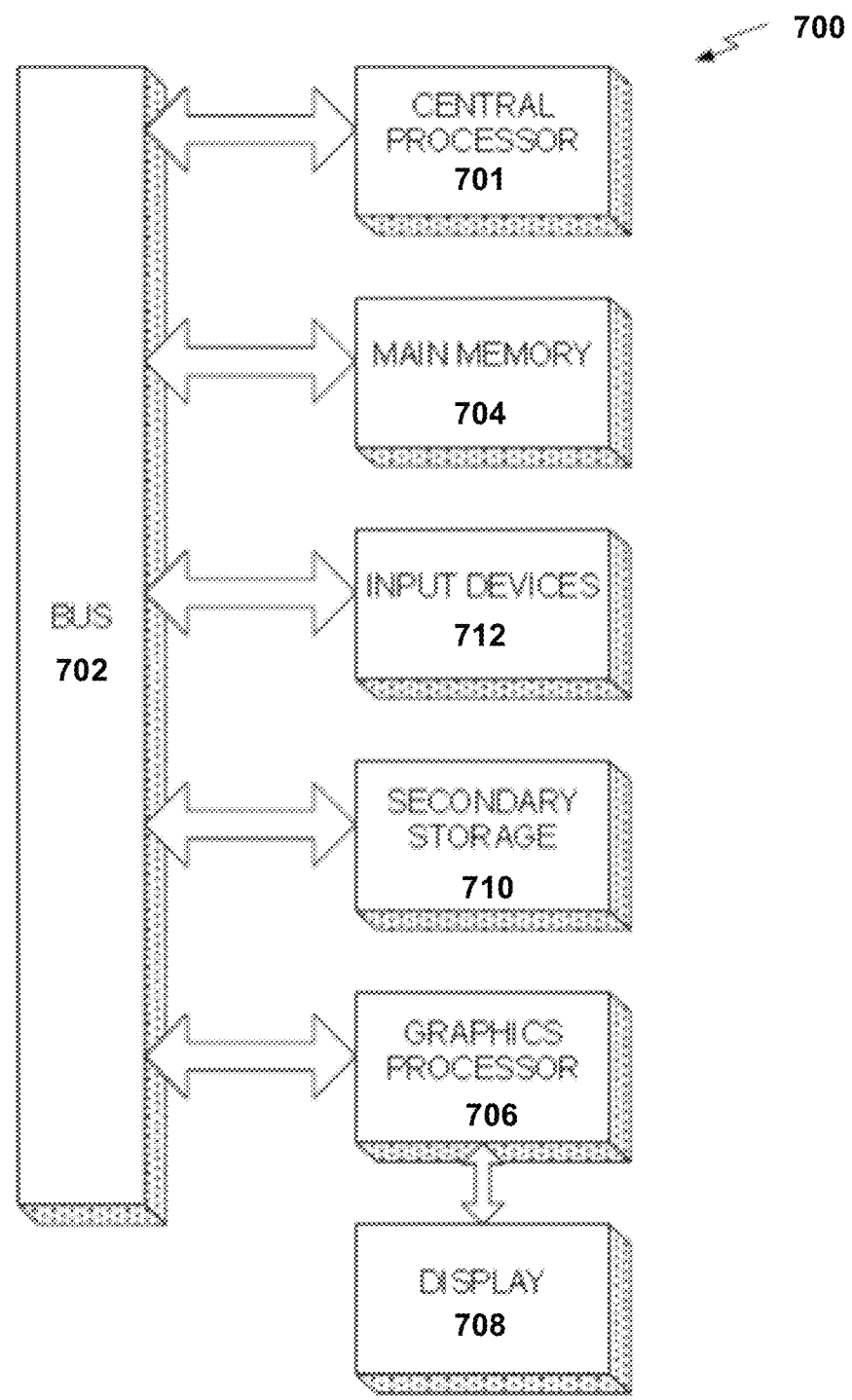
FIG. 7 illustrates an exemplary system in which the various architecture and/or functionality of all embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

Texture Level-of-Detail for Real-Time Ray Tracing

Overview

For filtered texturing targeting real-time ray tracing, one could either access mip level 0 with bilinear filtering or use a more sophisticated and expensive ray differentials method. However, a technique is presented that has approximately the same performance as accessing mip level 0, and at the same time yields substantially higher image quality. The image quality using this method may be even higher than ray differentials using a single trilinear lookup. This technique may be based on triangle properties, a curvature estimate, distance, and incident angle.

Introduction

Figure 8:
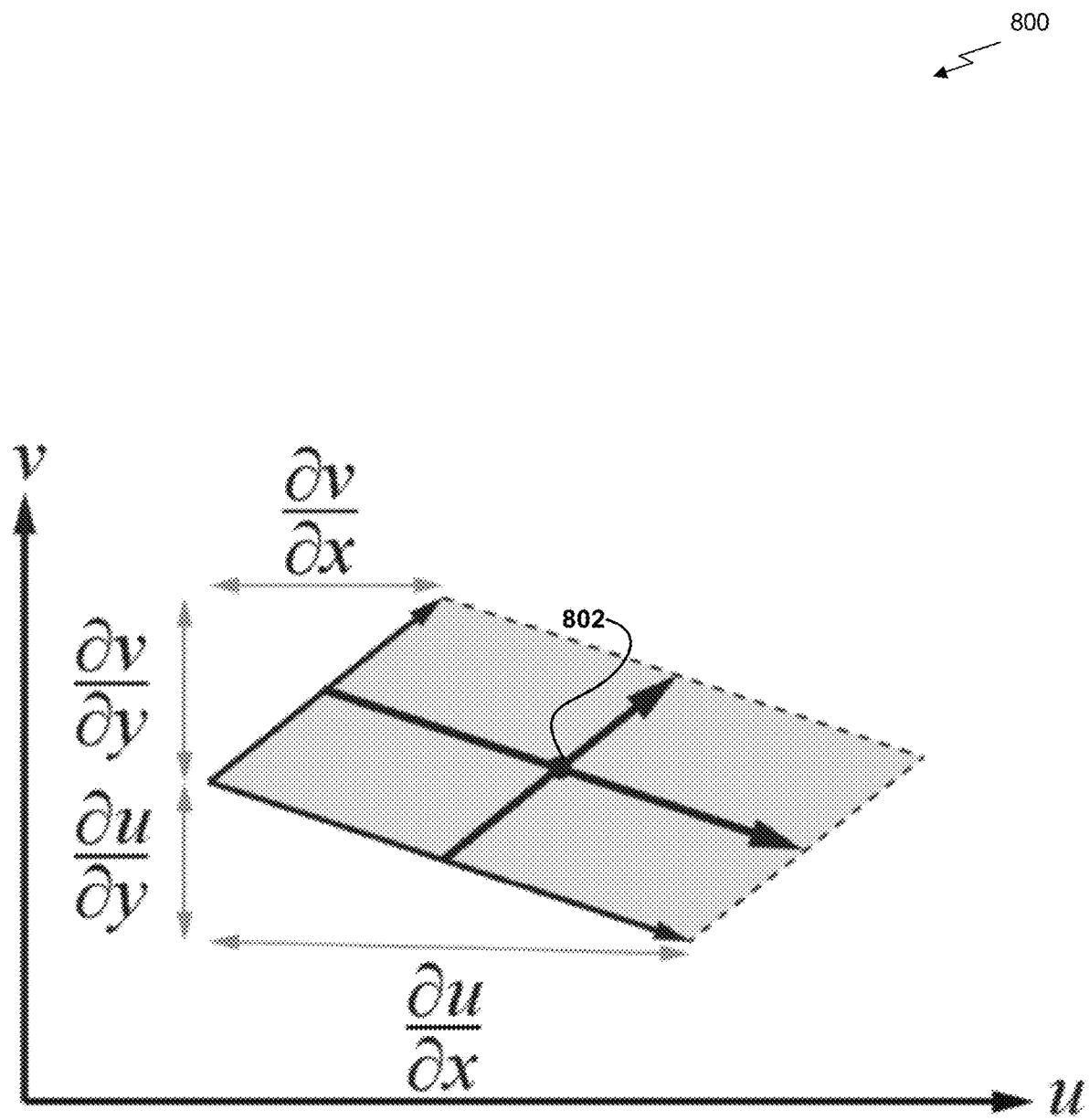
FIG. 8 illustrates an exemplary approximation of a footprint of a pixel in texture space, in accordance with one embodiment.

Mipmapping is a standard method to avoid texture aliasing, and all GPUs may support this technique for rasterization. OpenGL, for example, specifies the level-of-detail (LOD) parameter, $\lambda$, as:

$$\lambda(x,y) = \log_2 \lceil \rho(x,y) \rceil, \quad (1)$$

where (x,y) are pixel coordinates and the function $\rho$ may be computed as:

$$\rho(x, y) = \max\left\{ \sqrt{\left(\frac{\partial u}{\partial x}\right)^2 + \left(\frac{\partial v}{\partial x}\right)^2}, \sqrt{\left(\frac{\partial u}{\partial y}\right)^2 + \left(\frac{\partial v}{\partial y}\right)^2} \right\}, \quad (2)$$

for two-dimensional texture look-ups, where (u,v) are texel coordinates, i.e., texture coordinates ($\in [0, 1]^2$) multiplied with texture resolution. FIG. 8 illustrates an exemplary approximation of a footprint 800 of a pixel 802 in texture space, according to one exemplary embodiment.

One exemplary goal of these functions may be to ensure that access is done in the mipmap hierarchy in such a way that a screen-space pixel maps to approximately one texel. In general, GPU hardware may compute the differentials by evaluating the pixel shader in 2×2 pixel quads at a time, and using per-pixel differences. Note, however, that not even Equation 2 is conservative, since it does not compute a minimum box around the footprint. The maximum side of such a conservative box may be computed as $\rho(x,y) = \max(|\partial u/\partial x| + |\partial v/\partial x|, |\partial u/\partial y| + |\partial v/\partial y|)$. As a consequence, most methods may produce both overblur and aliasing, which is easy to prove using GPU-based texturing.

For ray tracing, the same goal may be desired but may needs to be extended to handle recursive ray paths. Since the pixel quad concept above may not be generally available for ray tracing (except possibly for eye rays), other approaches may be needed. For example, a ray differential method, using the chain rule, may accurately compute a texture footprint even for reflections and refractions. Using ray differentials may be computationally expensive and may use a substantial amount of per-ray data, and for real-time ray tracing, faster methods using a smaller amount of per-ray data may be required. In addition, results show that the ray differential method may not always be conservative either.

As a result, a new texture LOD method may be implemented, which may target real-time ray tracing, and which may exploit the mipmap structure. It may describe the ray footprint by a cone, and may then grow or shrink that cone along the ray path depending on surface interactions. The terms used may be based on a distance, a normal at a hit point, and texture and position coordinates. Results show that output quality is substantially better than using only mip level 0 with bilinear filtering and may even perform better than ray differentials with a single trilinear lookup.

For filtered texture mapping, a hierarchical image pyramid, called a mipmap, may be used to accelerate the process. The footprint of the pixel may be mapped to texture space, and a $\lambda$-value may be computed with a goal being to provide an alias-free image without overblurring. This $\lambda$, together with the texture coordinates of the current fragment, may then be used to apply a trilinear interpolation in the mipmap.

Many different approximations may be used for texture LOD. For example, one crude approximation may use a single LOD for an entire triangle. This may be computed as:

$$\Delta = \log_2\left(\sqrt{\frac{T_a}{P_a}}\right) = 0.5 \log_2\left(\frac{T_a}{P_a}\right), \quad (3)$$

where the variables $T_a$ and $P_a$ are twice the texel space areas and twice the triangle area in screen space. These are computed as:

$$T_a = t_w t_h |(t_{1u}-t_{0u})(t_{2v}-t_{0v}) - (t_{2u}-t_{0u})(t_{1v}-t_{0v})|,$$

$$P_a = |(p_{1x}-p_{0x})(p_{2y}-p_{0y}) - (p_{2x}-p_{0x})(p_{1y}-p_{0y})|, \quad (4)$$

where $t_w \times t_h$ is the dimension of the texture, $t_i = (t_{iu}, t_{iv})$ are the two-dimensional texture coordinates at each vertex, and $p_i = (p_{ix}, p_{iy})$, $i \in \{0, 1, 2\}$ are the three triangle vertices in screen space.

The area of the triangle can also be computed in world space as $$P_a = \|(p_1-p_0) \times (p_2-p_0)\|, \quad (5)$$

where $p_i = (p_{ix}, p_{iy}, p_{iz})$ now are in world space, and × denotes the cross product. This setup may be exploited, since Equation 3 may then give a 1-1 mapping between pixels and texels if the triangle is located on the plane z=1. In this case, $\Delta$ may be considered as a base texture level-of-detail of the triangle.

One method for filtered texturing for ray tracing may use ray differentials, may track these through the scene, and may apply the chain rule to model reflections and refractions. The computed LOD may be used either with regular mipmapping or with anisotropically sampled mipmapping. This may be extended to handle path tracing with general reflection and refraction functions. Other uses have been found for ray differentials as well. For example, they may be used to determine which geometrical level-of-detail to access in a multiresolution geometry cache system. Ray differentials may also be used to compute a suitable radius of the density estimation kernel for photon mapping.

In one embodiment, texture LOD for rasterization may be computed using differences in 2×2 pixel quads, with some overshading along edges as a result. For real-time ray tracing, rapidly computing texture level-of-detail may be valuable.

Exemplary Approach

One exemplary method for computing texture level-of-detail (LOD) may be based on tracing cones. For example, the method may be used only for texture LOD. In one embodiment, when the texture LOD $\lambda$ has been computed for a pixel, the texture sampler in the GPU may be used to perform trilinear mipmapping.

In one embodiment, an approximation may be derived for texture LOD for ray tracing. For example, an approximation to screen space mipmapping may be derived, and that may be extended to handle recursive ray tracing with reflections. In another embodiment, all sorts of surface interactions may be handled.

Figure 9:
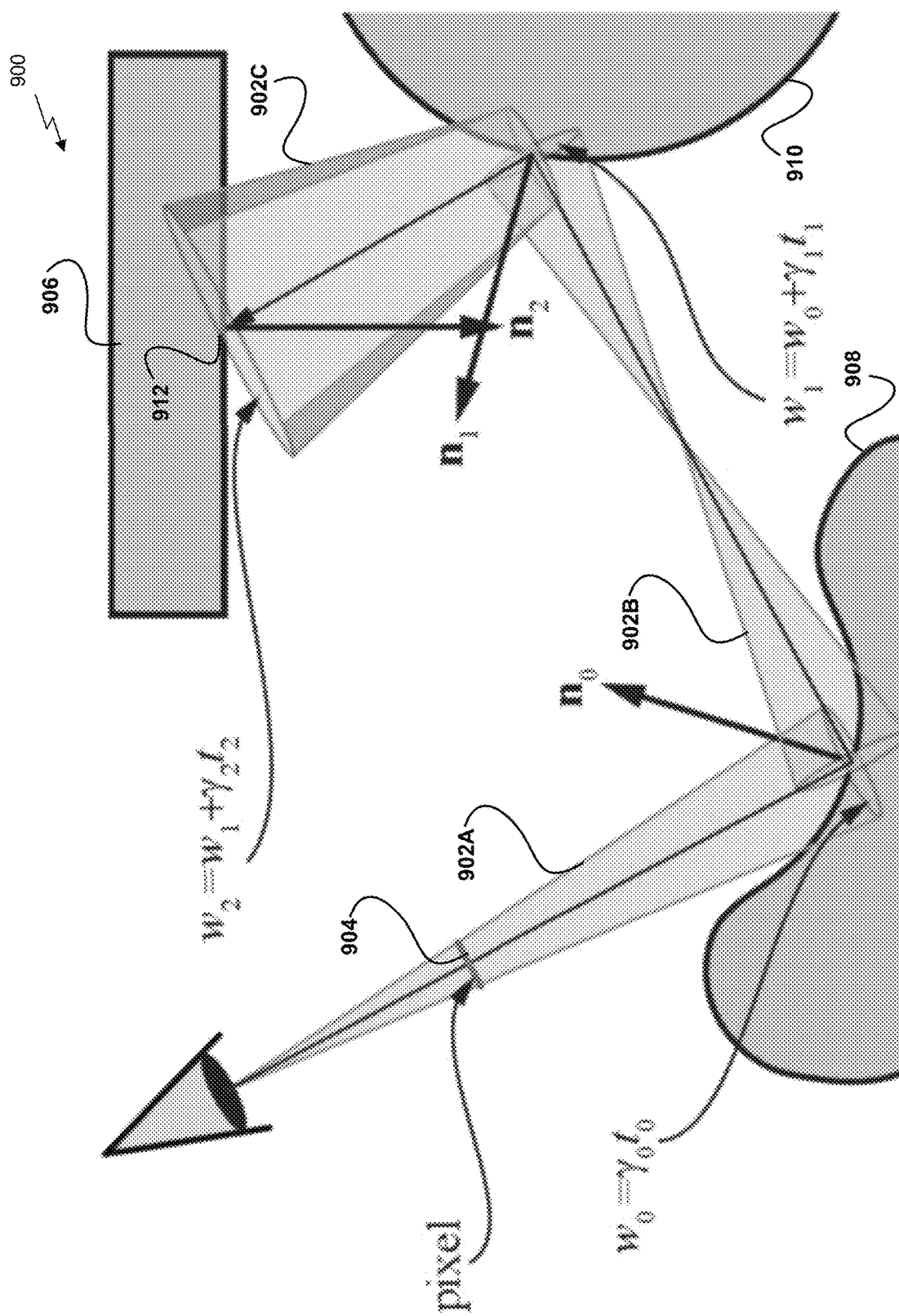
FIG. 9 illustrates an exemplary cone tracing implementation for computing texture LOD within a scene, in accordance with one embodiment.

FIG. 9 illustrates an exemplary cone tracing implementation for computing texture LOD within a scene 900, according to one embodiment. As shown, a cone 902A-C is created through a pixel 904 and it transported through the scene 900, growing and shrinking. In one embodiment, assuming that the rectangle 906 in the scene 900 is textured and the other objects 908 and 910 are perfectly reflective, a texture lookup may be performed at the hit point 912 on the rectangle 906 using the width of the cone 902C and the normal there, and a textured reflection may appear in the leftmost object 908.

Screen Space

Figure 10:
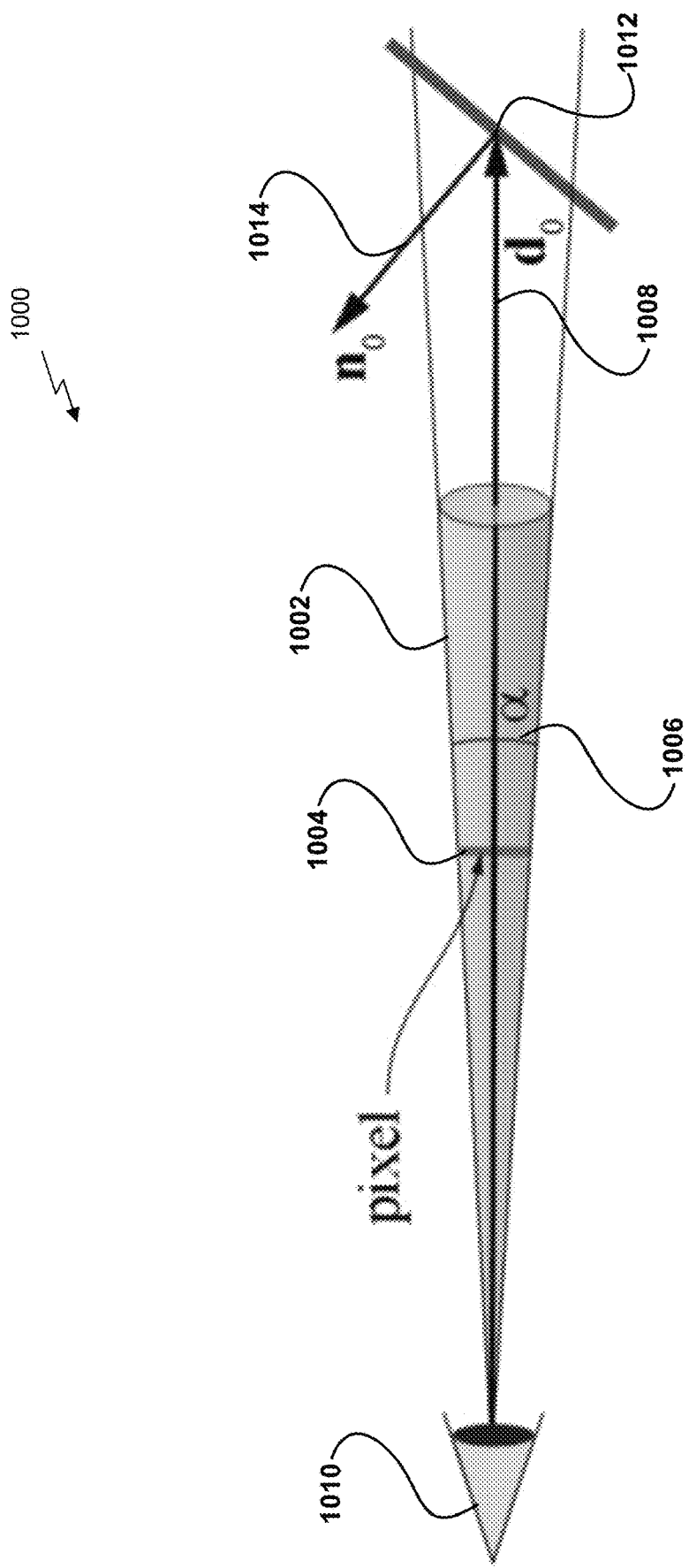
FIG. 10 illustrates an exemplary geometrical setup for a cone through a pixel, in accordance with one embodiment.

FIG. 10 illustrates an exemplary geometrical setup 1000 for a cone 1002 through a pixel 1004, according to one embodiment. As shown, the footprint angle 1006, also called spread angle, of a pixel is called a, do is the vector 1008 from the camera 1010 to the first hit point 1012, and no is the normal 1014 at the first hit point 1012. This cone 1002 may be tracked through a pixel 1004 and the cone parameters may be updated at each surface the center ray hits.

In one embodiment, the footprint width may grow with distance and at the first hit point 1012, the cone width may be $w_0 = 2\|v\| \tan(\alpha/2) \approx \alpha \|d_0\|$, where the index 0 may be used to indicate the first hit. The small angle approximation, i.e., $\tan \alpha \approx \alpha$, may be used in the expression above. The footprint projected onto the plane at the hit point may also change in size due to the angle, denoted [−d, n], between −d and n. The larger the angle, the more the ray can "see" of the triangle surface, and consequently, the LOD may increase (i.e., texel access may be done higher in the mipmap pyramid, etc.). Together these factors may form the approximated projected footprint as:

$$\alpha \|d_0\| \frac{1}{|\overline{n_0} \cdot \overline{d_0}|}, \quad (6)$$

where $\nabla$ indicates a normalized direction of v, and $\overline{n_0} \cdot \overline{d_0}$ models the square root of the projected area and a·b is the dot product between a and b. The absolute value is there to handle front-facing and back-facing triangles in the same way. When $[-d_0, n_0] = 0$, we only have the distance dependency, and as $[-d_0, n_0]$ grows, the projected footprint may get larger and larger towards infinity, when $[-d_0, n_0] \to \pi/2$.

Since the pixel to texel ratio (per edge, not per area) may halve if the term above doubles, $\log_2$ may be used on this term. Hence, a heuristic for texture LOD for the first hit, i.e., similar to what screen-space mipmapping produced by the GPU would yield, is $$\lambda = \Delta + \log_2\left(\frac{\alpha \|d_0\|}{w_0} \frac{1}{|\overline{n_0} \cdot \overline{d_0}|}\right), \quad (7)$$

where Δ, i.e., the base texture LOD at the current triangle, may be described by Equations 3 and 5. Note that Δ may be added to provide a reasonable base LOD when the triangle is located at z=1. This term may take changes in triangle vertices and texture coordinates into account. For example, if a triangle becomes twice as large, then the base LOD may decrease by one. The other factors in Equation 7 may push the LOD up in the mipmap pyramid, if the distance or the incident angle increases.

Reflection

Figure 11:
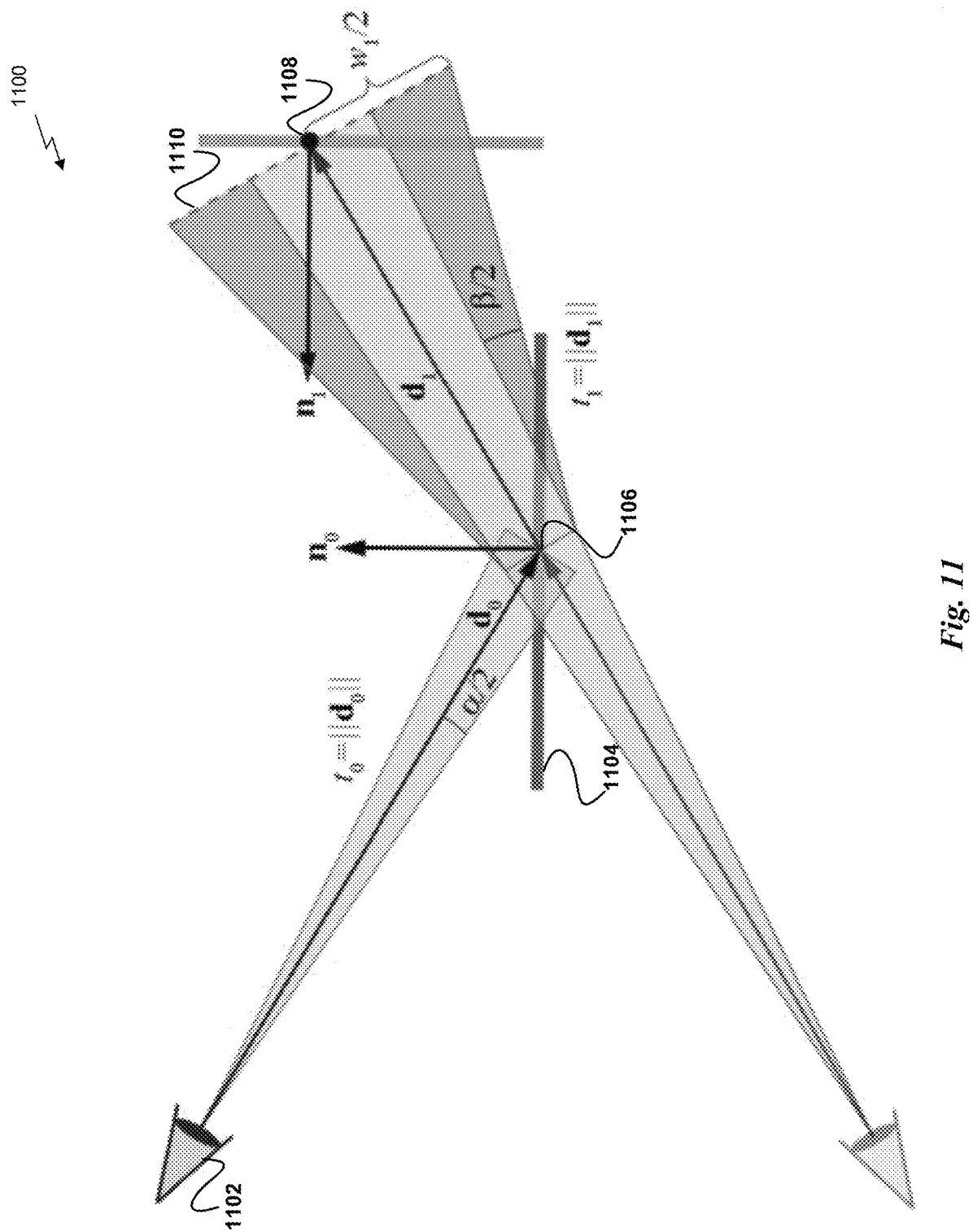
FIG. 11 illustrates an exemplary geometrical setup for computations for texture LOD for reflections, in accordance with one embodiment.

In one embodiment, the above method may be generalized to also handle reflections. FIG. 11 illustrates an exemplary geometrical setup 1100 for computations for texture LOD for reflections, according to one embodiment. As shown, the camera 1102 has been reflected in the plane 1104 of the surface hit point 1106, which makes the rays collinear. The reflected hit point 1108 is also shown.

In one embodiment, the width, $w_1$, of the footprint 1110 may be computed at the reflected hit point 1108. Note that the angle β is a curvature measure at the surface hit point 1106, and it may influence how much the spread angle will grow or shrink due to the different surface interactions.

Pixel Spread Angle

Figure 12:
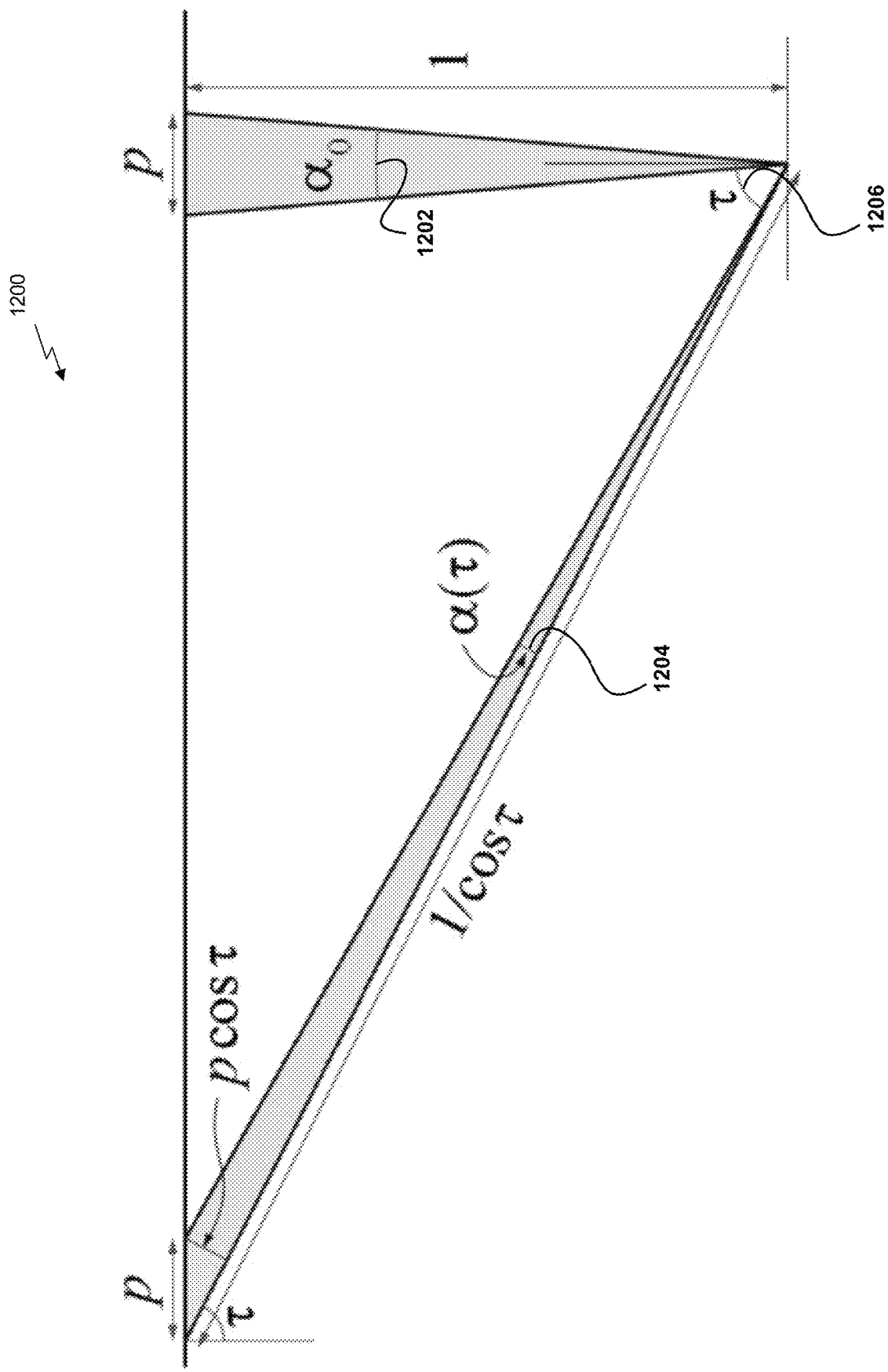
FIG. 12 illustrates an exemplary geometrical setup to compute $\alpha_0$ and $\alpha_{(T)}$, in accordance with one embodiment.

FIG. 12 illustrates an exemplary geometrical setup 1200 to compute $\alpha_0$ 1202 and $\alpha(\tau)$ 1204, according to one embodiment. As shown, α may be a function of angle τ 1206 to the pixel against the main camera axis, so it may be denoted it as $\alpha(\tau)$ 1204. In one embodiment, it may be assumed that the vertical field of view is ψ and that the screen resolution is W×H pixels.

In one embodiment, two methods may be used to compute the spread angle, α, of a pixel, e.g., for primary rays.

A first method may use a single value as an approximation for all pixels. For example, computation may be traded for increased accuracy. The angle, $\alpha_0$ 1202, is computed as:

$$\alpha(\tau) \approx \alpha_0 = \arctan\left(\frac{2 \tan(\psi/2)}{H}\right). \quad (11)$$

A second method may increase accuracy:

$$\tan(\alpha(\tau)/2) \approx \frac{0.5 p \cos \tau}{1/\cos \tau} = 0.5 p \cos^2 \tau \Leftrightarrow \alpha(\tau) \approx p \cos^2 \tau, \quad (12)$$

Where $\alpha(\tau) \approx \alpha_0 \cos^t \tau$. In extreme situations, e.g., for VR, the second approach may be used. Also, if a foveated renderer with eye tracking is used, a larger α may be used in the periphery.

Surface Spread Angle for Reflections

Figure 13:
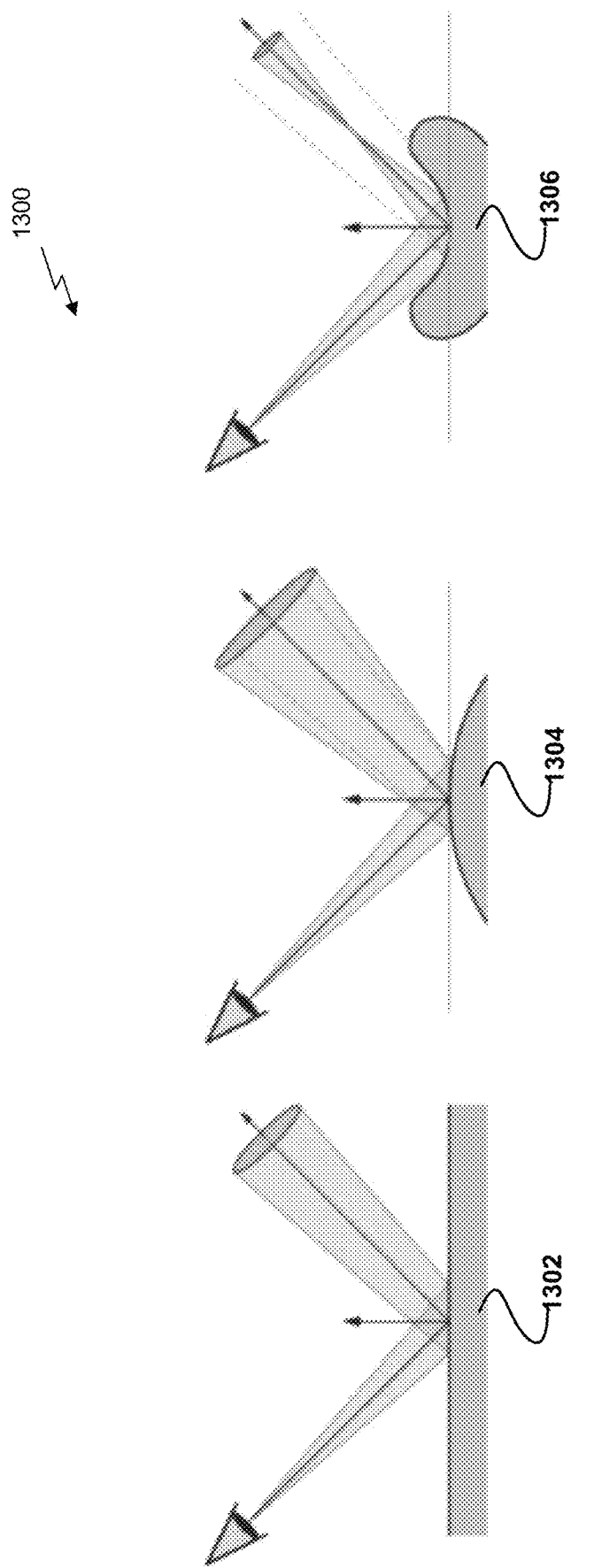
FIG. 13 illustrates exemplary reflection interaction at different types of geometry, in accordance with one embodiment.

FIG. 13 illustrates exemplary reflection interaction at different types of geometry 1300, according to one embodiment: a planar surface 1302, a convex surface 1304, and a concave surface 1306. Note how the convex surface 1304 grows an angle of a cone, while the concave surface 1306 reduces the angle of the cone, until it becomes zero, at which point it will start growing again. The surface spread angle β models how the cone footprint grows/shrinks due to the curvature of the surface. In this case, the surface is convex, and as a result, the footprint grows (β>0).

FIG. 13 illustrates the surface spread angle β, which will be 0 for planar reflections, >0 for convex reflections, and <0 for concave reflections. Intuitively, β models the extra spread induced by the curvature at the hit point. In general, the two principal curvatures at the hit point could be used or the radius of the mean curvature normal. However, a simpler and faster method may be utilized that only uses a single number β to indicate curvature.

Figure 14:
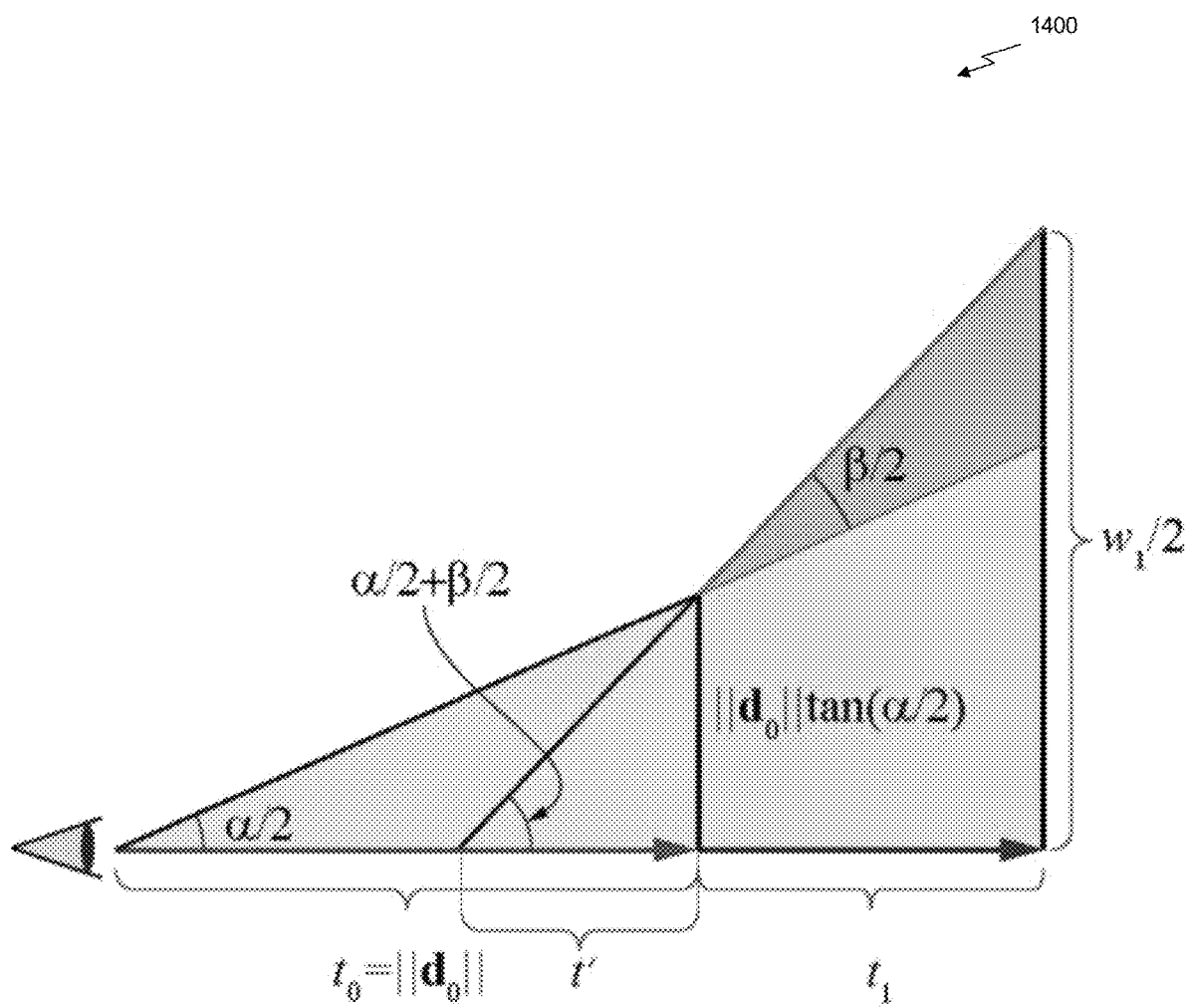
FIG. 14 illustrates an exemplary exaggerated view of a geometric setup for computations for texture LOD for reflections, in accordance with one embodiment.

Additionally, FIG. 14 illustrates an exemplary exaggerated view of a geometric setup 1400 for computations for texture LOD for reflections. It may be noted that:

$$\tan(\alpha/2 + \beta/2) = \frac{\|d_0\|\tan(\alpha/2)}{t'} \Leftrightarrow t' = \frac{\|d_0\|\tan(\alpha/2)}{\tan(\alpha/2 + \beta/2)} \quad (8)$$

and:

$$\tan(\alpha/2 + \beta/2) = \frac{w/2}{t' + t_1} \Leftrightarrow w = 2(t' + t_1)\tan(\alpha/2 + \beta/2). \quad (9)$$

In one embodiment, the expression from Equation 8 may be used for t' in Equation 9, which results in:

$$w_1 = 2\left(\frac{\|d_0\|\tan(\alpha/2)}{\tan(\alpha/2 + \beta/2)} + t_1\right)\tan(\alpha/2 + \beta/2) \quad (10)$$

$$= 2\|d_0\|\tan(\alpha/2) + 2t_1\tan(\alpha/2 + \beta/2)$$

$$\approx \alpha\|d_0\| + (\alpha + \beta)t_1 = w_0 + (\alpha + \beta)t_1,$$

where the small angle approximation $\tan\alpha \approx \alpha$ is used. In this way, $\alpha\|d_0\|$ may make the footprint grow with the distance from the eye to the first hit times the size, $\alpha$, of a pixel, and the second term may model the growth from the first hit to the second hit, which therefore depends on the distance $t_1$ (from first to second hit) and the angle $\alpha+\beta$.

If primary visibility is rasterized, then the G-buffer pass may be used to compute surface spread angle. The normalized normal at the hit point is n and the position of the fragment is p, both in world space, and dFdx and dFdy are used to obtain their differentials. The differential of p in x is denoted $\partial p/\partial x$.

Figure 15:
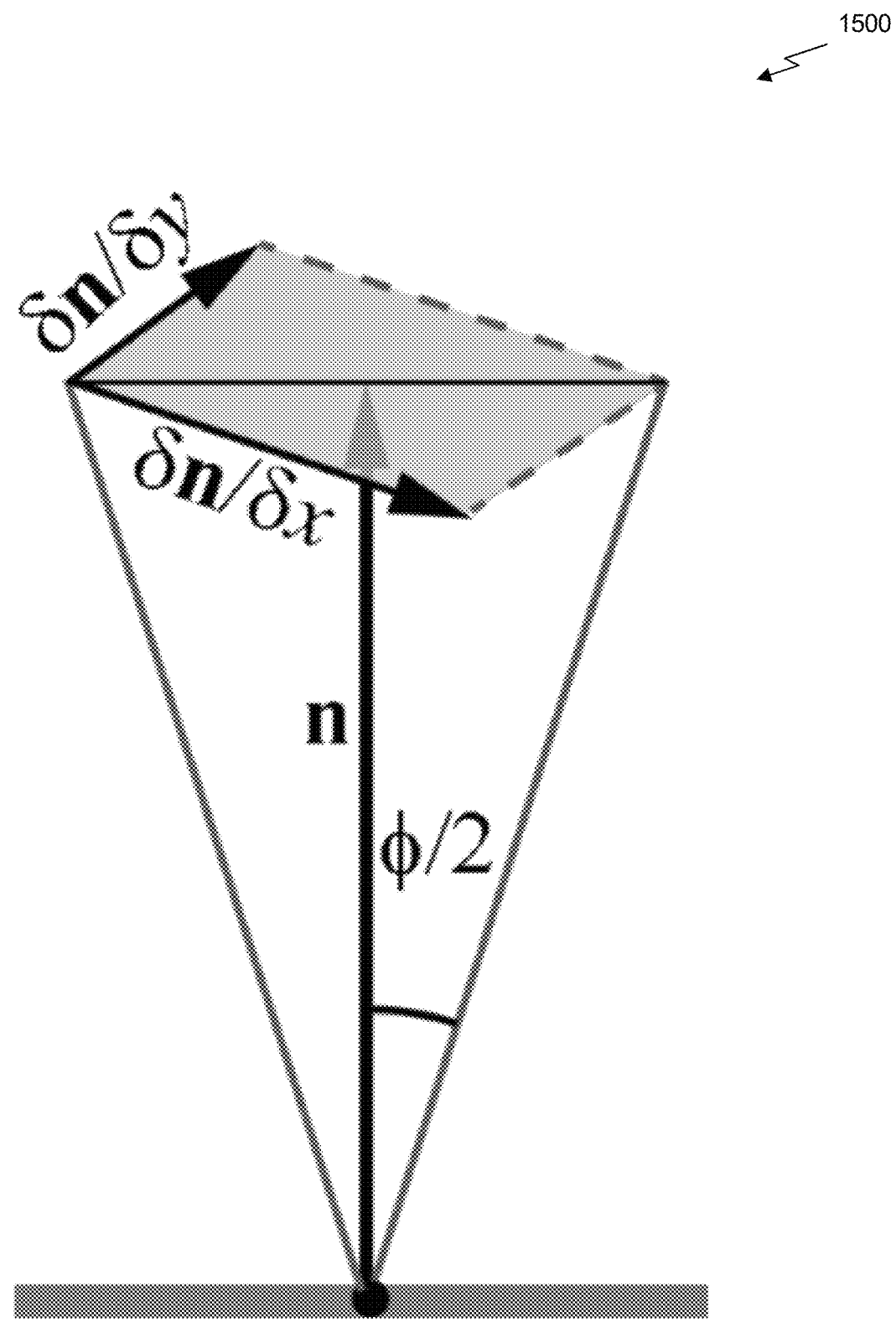
FIG. 15 illustrates an exemplary geometry involved in computing $\phi$ for determining a surface spread angle $\beta$, in accordance with one embodiment.

FIG. 15 illustrates an exemplary geometry 1500 involved in computing $\phi$ for determining a surface spread angle $\beta$, according to one embodiment. As illustrated by FIG. 15:

$$\phi = 2\arctan\left(\frac{1}{2}\sqrt{\frac{\partial n}{\partial x}\cdot\frac{\partial n}{\partial x} + \frac{\partial n}{\partial y}\cdot\frac{\partial n}{\partial y}}\right) \approx \sqrt{\frac{\partial n}{\partial x}\cdot\frac{\partial n}{\partial x} + \frac{\partial n}{\partial y}\cdot\frac{\partial n}{\partial y}}. \quad (13)$$

Figure 16:
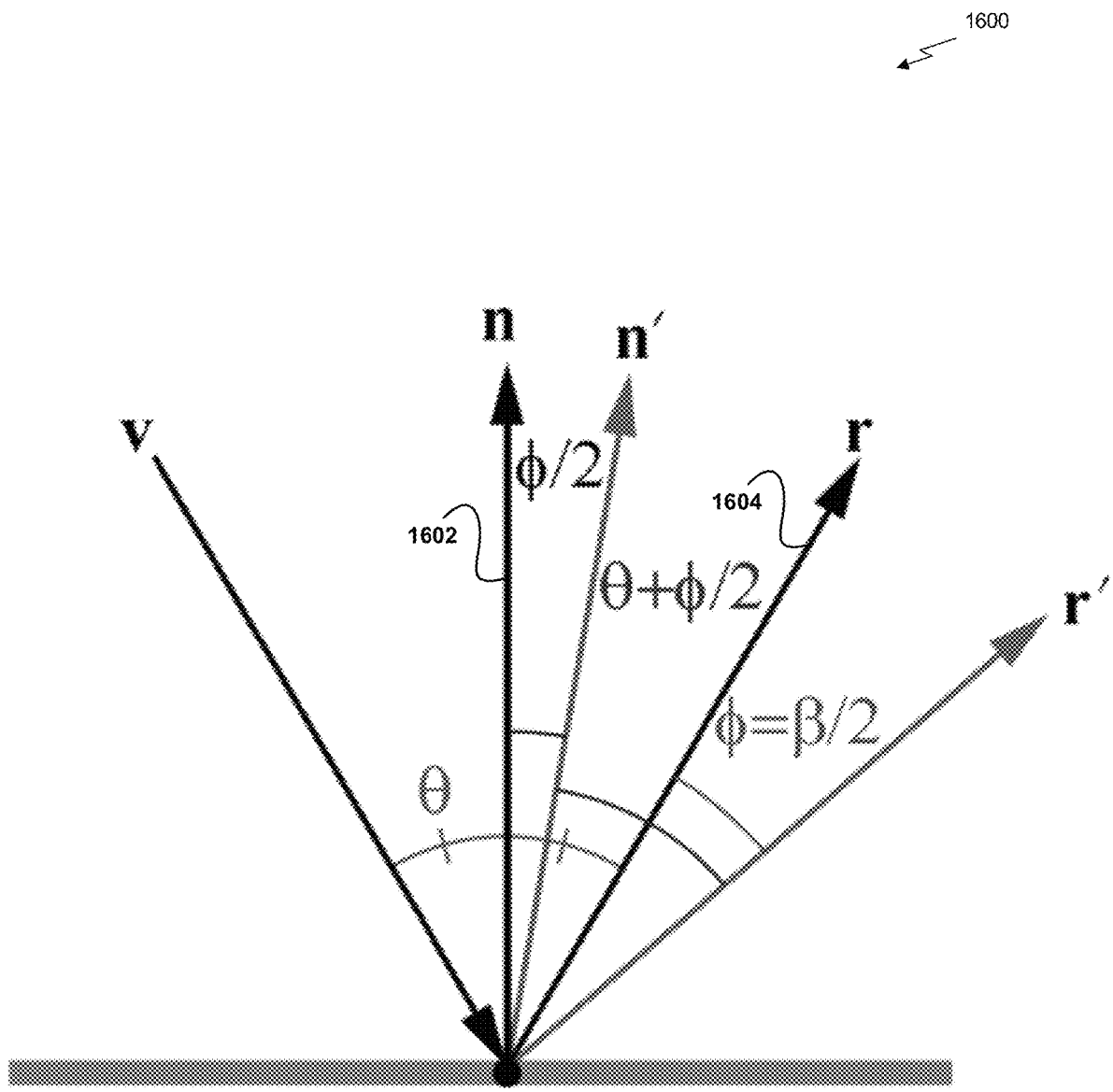
FIG. 16 illustrates an exemplary relationship between changes to a normal vector and a reflected vector, in accordance with one embodiment.

FIG. 16 illustrates an exemplary relationship 1600 between changes to a normal vector 1602 and a reflected vector 1604, according to one embodiment. An angular change in the normal vector 1602, in this case $\phi/2$, results in a change in the reflected vector 1604 which is twice as large. This means that $\beta=2\phi$. Two additional user constants $k_1$ and $k_2$ are added for $\beta$, as well as a sign factor s, resulting in $\beta=2k_1 s\phi+k_2$ with default values $k_1=1$ and $k_2=0$. In summary:

$$\beta = 2k_1 s\phi + k_2 \approx 2k_1 s\sqrt{\frac{\partial n}{\partial x}\cdot\frac{\partial n}{\partial x} + \frac{\partial n}{\partial y}\cdot\frac{\partial n}{\partial y}} + k_2. \quad (14)$$

A positive $\beta$ indicates a convex surface, while a negative indicates a concave surface region. Note that $\phi$ is always positive. So, depending on the type of surface, the s factor can switch a sign of $\beta$. s may be computed as:

$$s = \text{sign}\left(\frac{\partial p}{\partial x}\cdot\frac{\partial n}{\partial x} + \frac{\partial p}{\partial y}\cdot\frac{\partial n}{\partial y}\right), \quad (15)(A)$$

where sign returns 1 if the argument is >0 and −1 otherwise. The rationale behind this is that $$\frac{\partial p}{\partial x} \text{ and } \frac{\partial n}{\partial x}$$

(and similar for y) will have approximately the same direction when the local geometry is convex (positive dot product), and approximately opposite directions when it is concave (negative dot product).

In another embodiment, the sign factor s may be computed as:

$$s = \text{sign}\left(\left(\frac{\partial p}{\partial y}\times\frac{\partial p}{\partial x}\right)\cdot n\right), \quad (15)(B)$$

where sign returns 1 if the argument is >0 and −1 otherwise. If a glossy appearance is desired, the values of $k_1$ and $k_2$ may be increased. For planar surfaces, $\phi$ will be 0 which means that $k_1$ does not have any effect. Instead, the term $k_2$ may be used.

Generalization

Let i denote the enumerated hit point along a ray path, starting at 0. That is, the first hit is enumerated 0, and the second by 1, etc. All terms for texture LOD for the i:th hit point may then be put together as:

$$\lambda_i = \Delta_i + \log_2\left(|w_i|\cdot\left|\frac{1}{\bar{n}_i\cdot\bar{d}_i}\right|\right) = \underbrace{\Delta_i}_{Eqn.\ 3} + \underbrace{\log_2|w_i|}_{distance} - \underbrace{\log_2|\bar{n}_i\cdot\bar{d}_i|}_{normal}, \quad (16)$$

and as can be seen, it is similar to Equation 7 with both a distance and normal dependency. Recall that $n_i$ is the normal at the surface at the i:th hit point $d_i$ and is the vector to the i:th hit point from the previous hit point. The base triangle LOD, $\Delta_i$, now has a subscript i to indicate that it is the base LOD of the triangle at the i:th hit point that should be used. Similar to before, $\bar{d}_i$ means a normalized direction of $d_i$. Note that two absolute value functions have been added in Equation 16. The absolute value for the distance term is there since $\beta$ can be negative (e.g., for concave surface points). The absolute value for the normal term is there to handle back facing triangles in a consistent manner.

Note that $w_0=\alpha t_0=\gamma_0 t_0$ and $w_1=\alpha t_0+(\alpha+\beta_0)t_1=w_0+\gamma_1 t_1$, where $\gamma_0=\alpha$ and $\gamma_1=\alpha+\beta_0$, and $\beta_0$ is the surface spread angle at the first hit point. Hence, Equation 16 handles recursion, and in general it holds that:

$$w_i = w_{i-1} + \gamma_i t_i, \quad (17)$$

where $\gamma_i = \gamma_{i-1} + \beta_{i-1}$.

Pseudocode

Table 1 includes exemplary pseudocode implementing structures for performing ray tracing, in accordance with one embodiment. Of course, it should be noted that the pseudocode shown in Table 1 is set forth for illustrative purposes only, and thus should not be construed as limiting in any manner.

TABLE 1

```
struct Filter
{
    float width; // w_i
    float spreadAngle; // gamma_i
};
struct Ray
{
    float3 origin;
    float3 direction;
};
struct SurfaceHit
{
    float3 position;
    float3 normal;
    float surfaceSpreadAngle; // initialized according to Eq. 14
    float distance;
};
```

Table 2 includes exemplary pseudocode for performing ray tracing while handling recursive reflections, in accordance with one embodiment. Of course, it should be noted that the pseudocode shown in Table 2 is set forth for illustrative purposes only, and thus should not be construed as limiting in any manner.

TABLE 2

```
void rayGenerationShader (SurfaceHit gbuffer)
{
    Filter firstFilter = computeFilterFromGBuffer (gbuffer);
    Ray viewRay = getViewRay (pixel);
    Ray reflectedRay = computeReflectedRay (viewRay, gbuffer);
    rtTrace (closestHitProgram, reflectedRay, firstFilter);
}
Filter propagateFilter (Filter filter, surfaceSpreadAngle , hitT)
{
    Filter newFilter;
    newFilter.width = filter.spreadAngle * hitT + filter.width;
    newFilter.spreadAngle = spreadAngle + surfaceSpreadAngle;
    return newFilter;
}
Filter computeFilterFromGBuffer (SurfaceHit gbuffer)
{
    Filter filter;
    filter.width = 0; // no width when the ray cone starts
    filter.spreadAngle = pixelSpreadAngle (pixel);
    return propagateFilter (filter, gbuffer . surfaceSpreadAngle,
                gbuffer. distance);
}
void closestHitProgram (Ray ray, SurfaceHit surf, Filter filter)
{
    if (hasTextures)
    {
        float lambda = computeTextureLOD (ray, surf, filter);
        PerformTextureOperations (lambda);
    }
    if (isReflective)
    {
        Ray reflectedRay = computeReflectedRay (ray, surf);
        Filter reflectedFilter = propagateFilter (filter, surf.
                    surfaceSpreadAngle, surf.distance );
        rtTrace (closestHitProgram, reflectedRay, reflectedFilter);
    }
}
float computeTextureLOD (Ray ray, SurfaceHit surf, Filter filter)
{
    float lambda = log2 (abs(filter.width + surf.distance * filter.
                spreadAngle ));
    lambda += getTriangleLODConstant ( );
    lambda += 0.5 * log2 (texture.width * texture.height );
    lambda -= log2 (abs(dot(ray.direction , surf.normal )));
    return lambda;
}
```

Additionally, in one embodiment, ray differentials may be used for computing texture level-of-detail for ray tracing. This solution may provide high-quality results. Implementing ray differentials with a G-buffer may improve a performance of computing texture level-of-detail for ray tracing using ray differentials.

Ray Differentials

Ray differentials may include a method for handling filtered texture lookups. In one embodiment, assuming a ray is represented as:

$$r(t)=o+t\hat{d},  \quad (18)$$

where o is the ray origin, and $\hat{d}$ is the normalized ray direction, i.e., $\hat{d}=d/\|d\|$. The corresponding ray differential may consist of four vectors:

$$\left\{\frac{\partial o}{\partial x}, \frac{\partial o}{\partial y}, \frac{\partial \hat{d}}{\partial x}, \frac{\partial \hat{d}}{\partial y}\right\}, \quad (19)$$

where (x, y) are the screen-coordinates with one unit between adjacent pixels. One exemplary embodiment may include tracking a ray differential as it bounces around in the scene and interacts with surfaces. All interactions, e.g., reflections, refractions, transfer of a ray from one point to another, may be differentiated, and applied to the incoming ray differential to produce another as output. When a texture lookup is needed, the current ray differential may be used to estimate the texture footprint.

In one embodiment, a ray differential for the eye ray direction may be modified. The non-normalized ray direction d for a pixel launch coordinate (x, y) and with screen resolution $s=(s_x, s_y)$ may be generated in DXR as:

$$p = \left(\frac{x+0.5}{s_x}, \frac{y+0.5}{s_y}\right), \quad (20)$$

$$c = (2p_x - 1, 2p_y - 1),$$

$$d(x, y) = c_x r + c_y u + v = \left(\frac{2x+1}{s_x} - 1\right)r + \left(\frac{2y+1}{s_y} - 1\right)u + v,$$

or using some minor modification of this setup. Here, $p \in [0, 1]^2$, where the 0.5 s were added to get to the center of each pixel, i.e., the same as in DirectX and OpenGL, and thus $c \in [-1, 1]$. The right-hand, orthonormal camera basis is $\{r', u', v'\}$, i.e., $r'$ is the right-vector, $u'$ is the up-vector, and $v'$ is the view vector pointing toward the camera position. Note that we use $\{r, u, v\}$ in Equation 20, and these are just scaled versions of the camera basis, i.e., $$\{r,u,v\}=\{afr',-fu',-v'\} \quad (21)$$

where a is the aspect ratio and $f=\tan(\omega/2)$ where $\omega$ is the vertical field of view. For eye rays, the ray differentials for the direction may be computed as:

$$\frac{\partial d}{\partial x} = \frac{(d \cdot d)\hat{r} - (d \cdot \hat{r})d}{(d \cdot d)^{\frac{3}{2}}}, \quad (22)$$

where $\hat{r}$ is the vector from one pixel to next, which in our case is:

$$\hat{r} = d(x+1, y) - d(x, y) = \frac{2af}{s_x}r', \quad (23)$$

derived using Equation 20. For the y-direction, we use Equation 22 and replace $\hat{r}$ with $\hat{u}$, which is:

$$\hat{u} = d(x, y+1) - d(x, y) = -\frac{2f}{s_y} u'. \quad (24)$$

This may be all that is needed to set up the ray differential for eye rays.

Ray Differentials with G-Buffer

For real-time ray tracing, the eye rays may be rendered using rasterization into a G-buffer. When combining ray differentials with a G-buffer, the eye rays may not be set up as above. Instead, this may be done with help from the G-buffer. Here, we present three such methods, where we assume that a G-buffer has been created with normals, $\hat{n}$, and distances, t, to the closest hit. The methods then describe how the ray differential is set up when shooting the first ray from the position in the G-buffer.

A G-buffer is a screen-sized buffer generated using a pixel shader. In general, the scene is rendered using rasterization (not ray tracing) using the GPU, and a set of values are stored out to each pixel in the G-buffer. Subsequent render passes can then exploit the information in the G-buffer. We use the G-buffer because the GPU is currently faster to rasterize visibility from the eye compared to tracing eye rays using ray tracing (which would generate the same results, but slower). One can store a diffuse texture color, a normal, a world space position, etc. in the G-buffer. Anything applies here. However, for our purposes we have normalized normal $\hat{n}$ and the distances, t, to the hit points. What follows after the G-buffer pass is tracing, which starts with a ray-generation pass that creates rays. These are created from the positions stored in the G-buffer (which we do indirectly by storing the distance t). The methods below all perform their work in this ray generation pass and the goal is to create a ray differential representation so that we can trace the correct ray differential from the first hit point and onward out in the three-dimensional scene.

1-Dir Method

The idea of this method is simply to access the G-buffer to the right and above the current pixel and create a ray differential from these values. The normals and the distances, t for the current pixel (x, y) and for the neighbors (x+1, y) and (x, y+1) are read out from the G-buffer. Let us denote these by $\hat{n}_{0:0}$ for the current pixel, $\hat{n}_{+1:0}$ for the pixel to the right, and $\hat{n}_{0:+1}$ for the pixel above, and similarly for other variables. The eye ray directions, ê, for these neighbors are computed next using standard methods (e.g., using Equation 18). At this point, we can compute the ray differential of the ray origin at the first hit as:

$$\frac{\partial o}{\partial x} = t_{+1:0}\hat{e}_{+1:0} - t_{0:0}\hat{e}_{0:0}, \quad (25)$$

and similarly for $\partial o/\partial y$. The ray differential direction is computed as:

$$\frac{\partial \hat{d}}{\partial x} = r(\hat{e}_{+1:0}, \hat{n}_{+1:0}) - r(\hat{e}_{0:0}, \hat{n}_{0:0}), \quad (26)$$

where r is the shader function reflect( ), and ê is the ray direction from the eye.

Similar computations are done for $\partial \hat{d}/\partial y$. At this point, we have all components, $\{\partial o/\partial x, \partial o/\partial y, \hat{d}/\partial x \hat{d}/\partial y\}$, of the ray differential, which means that ray tracing with ray differentials can commence from the first hit.

Note that the 1-dir method is not something we would recommend because it has poor quality along many depth discontinuities. We present it here to be able to explain the next method in a simpler manner. Also note that in Table 1, we can see the differences between the 2-dir method and the extra G-buffer storage methods (below). They have different traits.

2-Dir Method

The method above is fast, but sometimes you hit different surfaces when comparing to the pixel to the right and above. A simple improvement is to test if $|t_{+1:0}-t_{0:0}|<\epsilon$, where $\epsilon$ is a small number (e.g., 0.01, etc.), and if so, access the G-buffer at −1:0 instead and use the one with the smallest difference in t. The same approach is used for the y-direction. This method may improve the results of the 1-dir method.

Extra G-Buffer Storage Method

This method computes and stores the entire ray differential at the first hit in the G-buffer. The $\partial o/\partial x$ and $\partial o/\partial y$ are computed using the built-in ddx( ) and ddy( ) functions on the hit point for the current pixel. Normals for neighboring pixels are obtained using these functions as well. The reflected ray directions may be computed using these normals and the differential eye ray directions. This method gives the same results are the original ray differential method, i.e., without a G-buffer pass.

In one embodiment, the G-buffer pass may be modified to store out the entire ray differential to the G-buffer. We currently do that as shown below, where passOut.color3-5 are different parts of the G-buffer.

Table 3 includes exemplary pseudocode for modifying a G-buffer pass to store an entire ray differential to the G-buffer, in accordance with one embodiment. Of course, it should be noted that the pseudocode shown in Table 3 is set forth for illustrative purposes only, and thus should not be construed as limiting in any manner.

TABLE 3

```
float3 dOdx = ddx(sd.posW);
float3 dOdy = ddy(sd.posW);
float3 dNdx = ddx(sd.N);
float3 dNdy = ddy(sd.N);
float3 Nx = normalize(sd.N + dNdx);
float3 Ny = normalize(sd.N + dNdy);
float3 tmp = sd.posW − gCamera.posW;
float3 Dx = normalize(tmp + dOdx);
float3 Dy = normalize(tmp + dOdy);
float3 R = reflect(−sd.V, sd.N);
float3 dRdx = reflect(Dx, Nx) − R;
float3 dRdy = reflect(Dy, Ny) − R;
passOut.color3 = float4(dOdx.x, dOdy.x, dRdx.x, dRdy.x);
passOut.color4 = float4(dOdx.y, dOdy.y, dRdx.y, dRdy.y);
passOut.color5 = float4(dOdx.z, dOdy.z, dRdx.z, dRdy.z);
```

Figure 17:
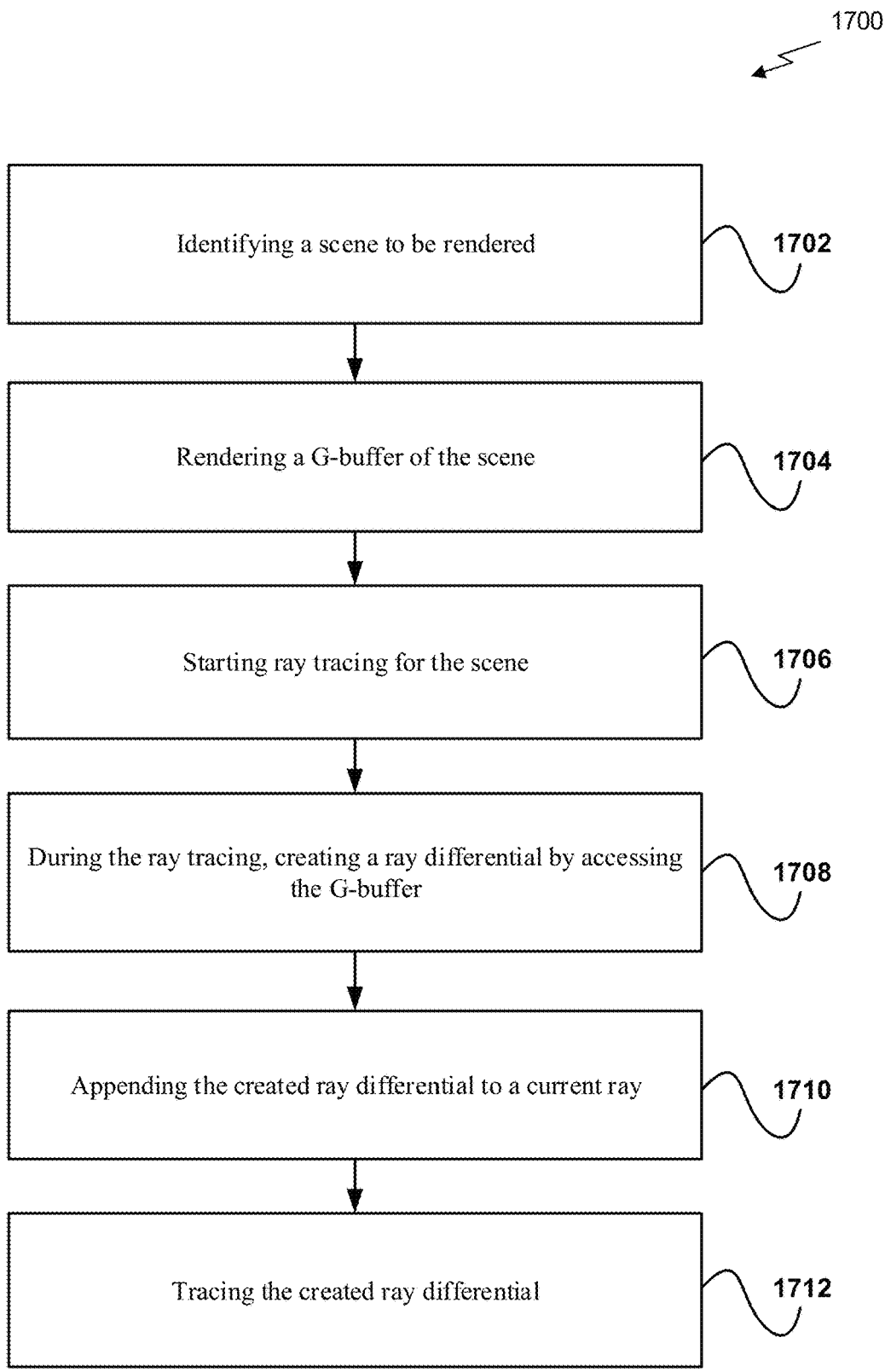
FIG. 17 illustrates a flowchart of a method for performing a texture level-of-detail approximation utilizing one or more ray differentials with a G-buffer, in accordance with one embodiment.

FIG. 17 illustrates a flowchart of a method 1700 for performing a texture level-of-detail approximation utilizing one or more ray differentials with a G-buffer, in accordance with one embodiment. As shown in operation 1702, a scene to be rendered is identified. Additionally, as shown in operation 1704, a G-buffer of the scene is rendered. For example, one or more attributes may be written to the G-buffer for each pixel in the scene. Further, as shown in operation 1706, ray tracing is started for the scene. Further still, as shown in operation 1708, during the ray tracing, a ray differential is created by accessing the G-buffer. In one embodiment, entries in the G-buffer for pixels to the right of the current pixel and/or to the left of the current pixel may be accessed within the G-buffer.

In another embodiment, entries in the G-buffer for pixels above the current pixel and/or below the current pixel may be accessed within the G-buffer. In another embodiment, G-buffer entries for pixels closest to the current pixel both horizontally and vertically may be accessed.

Also, as shown in operation 1710, the created ray differential is appended to a current ray. In addition, as shown in operation 1712, the created ray differential is traced.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
identifying a scene to be rendered;
rendering a G-buffer of the scene;
starting ray tracing for the scene;
during the ray tracing, creating a ray differential for a pixel by accessing the G-buffer for the pixel and one or more additional pixels neighboring the pixel;
appending the created ray differential to a current ray; and
tracing the created ray differential.

2. The method of claim 1, wherein the G-buffer is a screen-sized buffer generated using a pixel shader.

3. The method of claim 1, wherein one or more attributes are written to the G-buffer for each pixel in the scene when the G-buffer of the scene is rendered.

4. The method of claim 1, wherein creating the ray differential by accessing the G-buffer includes accessing entries in the G-buffer for the pixel and the one or more additional pixels that neighbor the pixel to the right and to the left within the G-buffer in order to create the ray differential in a x-direction.

5. The method of claim 1, wherein creating the ray differential by accessing the G-buffer includes accessing entries in the G-buffer for the pixel and the one or more additional pixels that neighbor the pixel above and/or below within the G-buffer in order to create the ray differential in a y-direction.

6. The method of claim 1, wherein G-buffer entries for pixels closest to the pixel both horizontally and vertically are accessed in order to create the ray differential in a x-direction and a y-direction.

7. The method of claim 1, wherein a distance t to a hit point is stored in the G-buffer.

8. The method of claim 1, wherein accessing the G-buffer for the pixel and one or more additional pixels neighboring the pixel includes accessing entries in the G-buffer for the pixel and one or more additional pixels neighboring the pixel, each entry of the entries storing a normal and a distance to a hit point for a corresponding pixel.

9. A system comprising:
a processor that is configured to:
identify a scene to be rendered;
render a G-buffer of the scene;
start ray tracing for the scene;
during the ray tracing, create a ray differential for a pixel by accessing the G-buffer for the pixel and one or more additional pixels neighboring the pixel;
append the created ray differential to a current ray; and
trace the created ray differential.

10. The system of claim 9, wherein the G-buffer is a screen-sized buffer generated using a pixel shader.

11. The system of claim 9, wherein one or more attributes are written to the G-buffer for each pixel in the scene when the G-buffer of the scene is rendered.

12. The system of claim 9, wherein creating the ray differential by accessing the G-buffer includes accessing entries in the G-buffer for the pixel and the one or more additional pixels that neighbor the pixel to the right and to the left within the G-buffer in order to create the ray differential in a x-direction.

13. The system of claim 9, wherein creating the ray differential by accessing the G-buffer includes accessing entries in the G-buffer for the pixel and the one or more additional pixels that neighbor the pixel above and/or below within the G-buffer in order to create the ray differential in a y-direction.

14. The system of claim 9, wherein G-buffer entries for pixels closest to the pixel both horizontally and vertically are accessed in order to create the ray differential in a x-direction and a y-direction.

15. The system of claim 9, wherein a distance t to a hit point is stored in the G-buffer.

16. A non-transitory computer-readable storage medium storing instructions that, when executed by a processor, causes the processor to perform steps comprising:
identifying a scene to be rendered;
rendering a G-buffer of the scene;
starting ray tracing for the scene;
during the ray tracing, creating a ray differential for a pixel by accessing the G-buffer for the pixel and one or more additional pixels neighboring the pixel;
appending the created ray differential to a current ray; and
tracing the created ray differential.

17. The non-transitory computer-readable storage medium of claim 16, wherein the G-buffer is a screen-sized buffer generated using a pixel shader.

18. The non-transitory computer-readable storage medium of claim 16, wherein one or more attributes are written to the G-buffer for each pixel in the scene when the G-buffer of the scene is rendered.

19. The non-transitory computer-readable storage medium of claim 16, wherein creating the ray differential by accessing the G-buffer includes accessing entries in the G-buffer for the pixel and the one or more additional pixels that neighbor the pixel to the right and to the left within the G-buffer in order to create the ray differential in a x-direction.

20. The non-transitory computer-readable storage medium of claim 16, wherein creating the ray differential by accessing the G-buffer includes accessing entries in the G-buffer for the pixel and the one or more additional pixels that neighbor the pixel above and/or below within the G-buffer in order to create the ray differential in a y-direction.

21. The non-transitory computer-readable storage medium of claim 16, wherein G-buffer entries for pixels closest to the pixel both horizontally and vertically are accessed in order to create the ray differential in a x-direction and a y-direction.

* * * * *